United States Patent
Amin et al.

(10) Patent No.: US 6,854,014 B1
(45) Date of Patent: Feb. 8, 2005

(54) SYSTEM AND METHOD FOR ACCOUNTING MANAGEMENT IN AN IP CENTRIC DISTRIBUTED NETWORK

(75) Inventors: Rajesh B. Amin, DeSoto, TX (US); Mike Hall, Carrollton, TX (US); John Allahyari, Dallas, TX (US)

(73) Assignee: Nortel Networks Limited, St. Laurent (CA)

( * ) Notice: Subject to any disclaimer, the term of this patent is extended or adjusted under 35 U.S.C. 154(b) by 800 days.

(21) Appl. No.: 09/707,522

(22) Filed: Nov. 7, 2000

(51) Int. Cl.[7] .............................................. G06F 15/16
(52) U.S. Cl. ........................ 709/227; 709/229; 370/352
(58) Field of Search ................................ 709/225, 226, 709/227, 229; 370/463, 401, 389, 352

(56) References Cited

U.S. PATENT DOCUMENTS

| | | | | |
|---|---|---|---|---|
| 5,682,482 A | * | 10/1997 | Burt et al. | ..................... 705/42 |
| 6,366,577 B1 | * | 4/2002 | Donovan | .................... 370/352 |
| 6,615,269 B1 | * | 9/2003 | Suumaki et al. | ............ 709/230 |
| 6,662,221 B1 | * | 12/2003 | Gonda et al. | ................ 709/223 |
| 6,684,251 B1 | * | 1/2004 | Qiu et al. | .................... 709/228 |
| 6,691,164 B1 | * | 2/2004 | Hundscheidt et al. | ....... 709/225 |
| 6,714,987 B1 | * | 3/2004 | Amin et al. | ................. 709/249 |

* cited by examiner

*Primary Examiner*—Mehmet B. Geckil
(74) *Attorney, Agent, or Firm*—Haynes and Boone, LLP

(57) ABSTRACT

A system and method for a first user to communicate in an Internet Protocol (IP) centric distributed network is described. The method can include a plurality of service layers including a network service function layer, a local service function layer, and an access service function layer providing a plurality of functions associated with each of the service layers. The method can also include accessing the network to establish a point of presence at an access management layer and a core portion of the network and to designate a default amount of bandwidth and plurality of default setup parameters; invoking service through an application server on the network to establish an amount of network resources requested by the first user; establishing a transport session to create and manage a connection from the first user to a destination address; and accounting for a service session within the IP centric distributed network.

90 Claims, 10 Drawing Sheets t = TIME
i = INTERIM DATA TRANSFER INTERVAL
STR = Start_Record SENT
STP = Stop_Record SENT
I = Interim_Record SENT

SYSTEM AND METHOD FOR ACCOUNTING MANAGEMENT IN AN IP CENTRIC DISTRIBUTED NETWORK

CROSS-REFERENCES TO RELATED APPLICATION

This application is related to the following patent/application: U.S. Pat. No. 6,714,987 entitled "Architecture for an IP Centric Distributed Network" and filed on Nov. 5, 1999, and U.S. patent application Ser. No. 09/624,066 entitled "A system and method for service session management in an IP centric distributed network" and filed on Jul. 24, 2000.

FIELD OF THE INVENTION

The invention relates generally to accounting management activities for computers and, more particularly, to an accounting architecture for an Internet Protocol centric distributed network that supports data and telecommunication services and a method and apparatus for such a network.

BACKGROUND OF THE INVENTION

Recently, wireless communication devices have become more and more popular as a method of communicating from one point to another. Cellular Radio is one, and probably the most popular, method of wireless communication. The wireless communication uses different air technology to convey content or application information to the wireless communication devices. The network service providers may use different air technology regionally. The earlier systems as a whole have been focused on providing services to the end users within the limitations of the air technology used. Also, services are tightly coupled with the access network service providers.

However, recently, the need for a network designed with air technology agnostic has risen. The service providers' desire to offer identical services to the end devices regardless of the air technology used. In addition to air technology agnostic need, network service providers wish to support multiple access technologies such as wireless, wireline, LAN networks etc. Also, the end user wishes to receive services from their choice of service providers.

Such requirements led to separation of network. The logical separation of network is taking place for access service provider, network (core) service provider, application or service application provider and infrastructure (transport) service provider. Such network resources are not unlimited. Therefore, network resources must account for traffic flows entering a network. Thus, a definite need for accounting management architecture has arisen that provides scheme and procedure to record network usages for monitoring and billing purpose. Moreover, multiple service providers may need different accounting schemes. Thus, an accounting management of the proposed network should be flexible to capture various metrics for usage from which each service provider can accommodate their billing strategies.

SUMMARY OF THE INVENTION

In contrast to the prior art as in legacy telecommunication networks, the present invention is based on U.S. Pat. No. 6,714,987 entitled "Architecture for an IP Centric Distributed Network" and filed on Nov. 5, 1999, and U.S. patent application Ser. No. 09/624,066 entitled "A system and method for service session management in an IP centric distributed network" and filed on Jul. 24, 2000. These patents describe the next generation network (NGN) architecture centered on UP mobility management, call/session management, and network management services and service session management activities respectively. Collectively, these patents provide network architecture baseline and identifies network services. An accounting management service is one of the network services coordinated between system component that monitor and record network resources used.

The accounting management aspects enforce the accounting and billing policies for services, collect and report the charging data to the operator's billing system. An accounting client can be at an application server, an access network, or possibly at the end device. Such accounting clients facilitate the accounting activities at the service level for the end users. The accounting server and policy manager (alternatively authorization server) components of the core network in coordination with the accounting clients for an example at an access network and the connection manager facilitates various accounting need for various network resources usage. The accounting server interface with the storage disk to protect and store collected accounting data. The billing server interface with such devices to fetch collected data in order to create customer billable record.

The present invention provides positioning of the accounting management architectural components and their responsibilities within an IP centric distributed network. The interactions between these components use publicly available standard protocols. The configuration of accounting management activities primarily distributed in various session establishment tasks. The session establishment tasks include access, service and transport session establishment.

The concept and model presented for the accounting management in the NGN architecture provides several advantages. The accounting management activities are loosely coupled and distributed in various system components (e.g. access network, core network, and service application platform). These system components can belong to a single service provider or distributed with different service (access, core, infrastructure) providers. This allows service provider to form an alliance with multiple service providers, offer flexible accounting management capabilities and extends unlimited applications or services to the end users.

An accounting architecture is based on a traditional client/server model as described in the publicly available IETF DIAMETER protocol specification. An Internet Accounting Management model is provided in FIG. 1: Internet Accounting Management Model—Abstract level. In general, any system component responsible for collecting and reporting accounting measurements is known as an "Accounting Client". The Accounting Clients use the DIAMETER protocol to report the measurements to an entity called the "Accounting Server". An "Accounting Server" resides at the service provider's domain. These measurements can represent an entire session from start to end or they can represent ongoing values for a session in progress that is known as "interim data".

In support of Authentication, Authorization and Accounting (AAA) functionality, the IETF has defined a RADIUS (Remote Authentication Dial In User Service) protocol. RADIUS supports a client-server model that was originally designed for Authentication and Authorization purposes for dial up connections. Subsequently it has been enhanced for Accounting purposes.

DIAMETER (2*RADIUS) is a more flexible and secure protocol that supports Authentication, Authorization, and Accounting functionality. DIAMETER Accounting messages leverage on the existing RADIUS messages.

The DIAMETER protocol defines the following logical messages:

Start_Record—sent when an accounting session starts

Interim_Record—sent during the accounting session to report interim usage counts Stop_Record—sent when an accounting session ends The Internet accounting management architecture involves interactions between the accounting clients in the network elements, application servers and accounting servers in the service provider's domain, and billing servers. The network element collects resource consumption data in the form of accounting metrics. This information is then transferred to an Accounting Server in the service provider's domain. Typically this is accomplished via an accounting protocol (e.g. DIAMETER), although it is also possible for network elements to generate their own proprietary session records.

The accounting server then processes the accounting data received from the network element. This processing may include summarization of interim accounting information, elimination of duplicate data, generation of detailed records to signify completion of a session, and/or routing of detailed records to another service provider's accounting server in support of roaming.

The processed accounting data is eventually submitted to a subscriber's home billing server, which typically handles rating and invoice generation, but may also carry out auditing, cost allocation, trend analysis or capacity planning functions.

The Accounting Server receives the DIAMETER messages and provides functions, such as message relay of completed session records to other Accounting Servers for consolidation, file transfer to a downstream billing system, and persistent storage via disk.

DETAILED DESCRIPTION OF THE PREFERRED EMBODIMENTS

Figure 1:
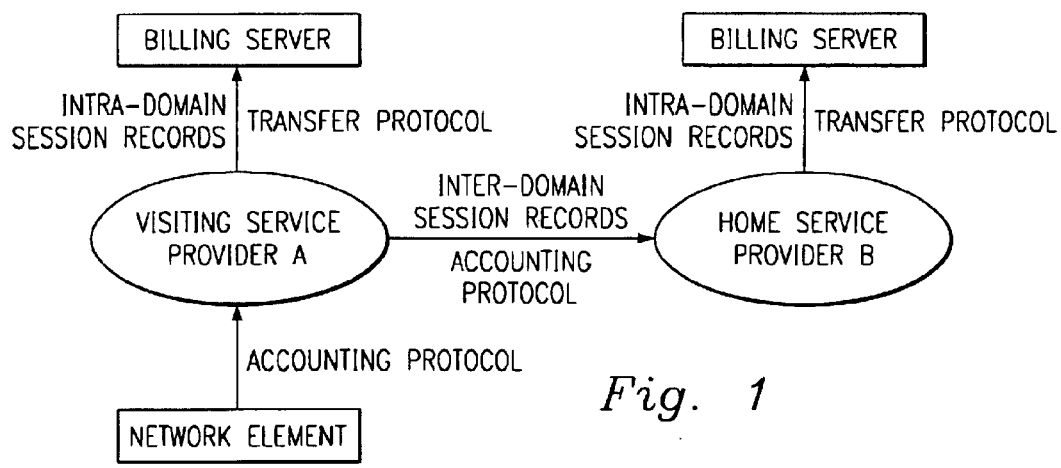
FIG. 1 illustrates an embodiment of Internet Accounting Management Model.

The present invention can be described with several examples illustrated in figures and scenarios provided through out this document. It is understood, however, that the examples are not necessarily limitations to the present invention, but are used to describe typical embodiments of operation. Moreover, in order to simplify discussion, certain protocols such as DIAMETER, LDAP, COPS, etc. are used as an example. In fact, the NGN accounting management architecture is flexible to adopt any publicly available protocols for the similar functions. For an example, other alternative protocol for DIM ER may include RADIUS, TACACS or it's extensions, etc. An appropriate procedure may require specific client server applications for relevant protocol. Also, at instances Radio Access Network is illustrated for simplicity for access network. In fact, the NGN accounting management architecture is access network agnostic. Additionally, a list of abbreviations and glossary will be listed first to facilitate a better understanding of the invention.

Abbreviations

AAA Authorization Authentication Accounting

AAA+ Authentication, Authorization, and Accounting extension

ASP Application Service Provider

API Application Protocol Interface dB data Base

DEN Directory Enabled Networking

DS Directory Server

IP Internet Protocol

LDAP Lightweight Directory Access Protocol

LDP Local Decision Point

LSF Local Serving Function

MH Mobile Host

MM Mobility Manager

Ms Mobile Station

NSF Network Serving Function

NGN Next Generation Network

PEP Policy Enforcement Point

PDP Policy Decision Point

QoS Quality of Service

RADIUS Remote Authentication Dial In User Service

RAN Radio Access Network

SA Security Association

SAE Service Accounting Entry

SDR Session Detail Record

SM Session Management (role or function)

SSM Service Session Management xAN Any Access Network

UD Unified Directory

UAE Usage Accounting Entry

Definition of Terms

NGN: The Next Generation Network is the IP centric core-network consisting of LSF and NSF network components. The NGN is assumed to be independent of air interface technology. The interfaces between system components of the NGN are based on the LAN/WAN technology and uses client server architecture. The unified network and the next generation network terms provide the same meaning and used interchangeably in this document.

Access Session: A specific type of session established between a Mobile Host (MH and the Radio Access Network (RAN) when the MH powers on and registers to the LSF. A link is established from the mobile host to the connection management component within the RAN. Once the access session is established, the mobile host becomes an IP capable host that can reach or be reached by any other device. The access session remains active at all times as long as the mobile host remains attached to the serving network.

Accounting: The act of collecting information on resource usage for the purpose of trend analysis, auditing, billing, or cost allocation.

Accounting Client: The Accounting Client collects resource consumption data in the form of accounting data. This information is then transferred to an accounting server located at the LSF using accounting protocol (e.g. DIAMETER). The Accounting Clients can reside at the access network (e.g. RAN), allied application servers that provides services in association with the core network components or third party application servers in the Internet.

Accounting Model Indicator: A specific field within the accounting policy stored in the policy server. It is passed as a field within the user's profile to an accounting client to define the method and timeliness of data collection (batch, poll, or real-time transfer).

Accounting Server: The accounting server receives accounting data from Accounting Clients via accounting protocol (e.g. DIAMETER). The Accounting Server provides summarization, correlation of the accounting records, and translates them into session detail records (SDRs). The accounting server in the LSF routes the session detail records to the accounting server in the NSF for persistent storage.

Accounting Session: For any session (Service Session or Access Session), an Accounting Session is created at the Accounting Server in the LSF. A session may generate one or more Accounting Sessions due to handoff/roaming. The Accounting Sessions are initiated by the Accounting Clients by sending an accounting Start_Record to the Accounting Server. A Session Detail Record (SDR) is allocated for each accounting session and is updated as the session progresses. The Accounting Server holds and maintains the state of the Accounting Session. The termination of an Accounting Session occurs when a Stop_Record is received from an Accounting Client.

Accounting Session ID: Each Accounting Session has a unique Accounting Session ID, which is different from session ID. If a single session requires multiple SDRs, the Accounting Session ID is the same across the multiple SDRs. For an access session, the Accounting Session ID is created by the xAN when a default UAE is created. For a service session, the Accounting Session ID is created in the application server when an SAE is created.

Application server: An application server provides services to the end user.

Allied application server: An application server provides services to the end user. An allied application server provides services to the end user in association with the core network of the serving service provider. An allied application server uses serving service provider's network resources in facilitating value added services to the end user. For an example, an application server that provides protocol services can use certain session management functions provided by the core network components to facilitate change of bandwidth, quality of service, or change in QoS etc.

Third party application server: The third party application server provides services to the end user independent from the core network components of the network service provider. In this case, for an example, the third party application server is limited to provide any service to the end user to the default bandwidth or quality of service provided during access session establishment.

Authentication: The act of verifying the identity of an entity (mobile host user).

Authorization: The act of determining whether a requesting entity (mobile host user) will be allowed access to a resource or service.

Billing Server: A server typically residing outside the service provider network. It is in charge of collecting the accounting data from multiple networks, performing any final record correlation, and generating the billing invoices for subscribers.

Connection Manager: The Connection Manager entity is the part of an access network support in the NGN architecture. It can be addressed using IP address. Thus, any components for an example, from access network or core network can interface with the Connection Manager entity. Basically, this entity provides routing functions such as access gateway or router. With respect to the accounting architecture, this entity collects usage data and reports to an accounting client application that is associated at the access network. The Connection Manager can receive IP level messages and provide policy enforcement functions for the data transiting through it. Based on policy decision provided, or through other mechanism, it can enforce data collection function as requested.

Core Network: The core network indicates the network specific functional components that can provide the decision-making capabilities in order to provide services to the end users, application service platforms, and to other networks. The core network can be hierarchically divided into sub layers as needed based on the network scope and coverage Commonly the core network is divided into two service layers; a local service layer and network service layer. The core network is access agnostic.

DS: The Directory Server provides interfaces to the Unified Directory (databases). The Directory Server services give structure to complex and heterogeneous networks by enabling the tools that provide access to, and management of networks. The client of the directory server access the information contained in these databases via a standard access protocol such as DAP or LDAP. The database schema, the type of database and storage techniques is transparent to the clients. The directory server receives the queries from the clients and retrieves the information from the databases. The interface between the directory server and the databases may be proprietary or standard based. The directory server formats the information retrieved from the database and sends it back to the client in the appropriate response message.

Interim_Record: An Interim_Record contains cumulative accounting information for the duration of one interval only. The selection of whether to use Interim_Record is directed by the DIAMETER Accounting_Interim_Interval attribute.

LSF: The LSF is the serving area network for sets of access networks. It is owned by the operator and separated by the geographical parameters. It consists of several system components. Some of these components are call servers, mobility manager, directory server, DHCP, DNS, Gateway devices, etc. The Local Serving function (LSF) is the serving component of the UN that provides services to local and visiting subscriber (users) in that area.

Local service layer: The local service layer is part of the core network. It externally interfaces towards an access network and the service application servers. It facilitates the ingress and egress activities relevant to the end users. Also, internally it interfaces with the network service layer that provides global network functions.

Network service layer: The network service layer is part of the core network. It externally interfaces towards other global networks, and application servers. It facilitates the information bridging between different networks. Also, internally it interfaces with the local service layer to exchange relevant information.

Network services: The network services are the services those are provided by the core network components. The core network components are hierarchically distributed in local service layer and network service layer. The network service functions are the functions provided by the network service layer functional components. And, the local service functions are the functions provided by the local service layer functional components. The network services include the accounting management functions.

NSF: The Network Serving Function is the home network that owns the subscription associated with the end user. It is a user subscription "defined" entity. It consists of several system components. These components may include legacy components through the necessary interfaces or their functional equivalent suitable to the IP centric environment. Some of these components are HLR, SCP, Unified Directory, AAA server, SN, IP Application Service Platform (provides value added applications to the client), etc. Network Serving Function (NSF) is the global home component of the UN that owns the end user's subscription.

RAN: The Radio Access Network is the system component of the wireless network that provides radio control functions used in transmitting and receiving control and data information between mobiles and core network. The RAN itself is air technology dependent. However, it is evolving to provide independent functionality towards the IP centric core network. On this basis, RAN is assumed to have distinct radio interface and radio management components. Thus, radio management components provide the radio independent functionality towards the IP centric core network. Radio Access Network. RAN is used as an example where appropriate. However, xAN is the correct terminology represents any access technology.

SAE: Service Accounting Entry (SAE) is a buffer at the Core network allied application server containing accounting data relevant to a specific service invocation. Service Session: A specific type of session established between a Mobile Host (MH) and the LSF when the MH invokes an LSF-provided service. A link is established from the mobile host to the application server component within the LSF. Once the service session is established, the LSF components coordinate in providing the requested service. The service session remains active until it is explicitly halted by the user or terminating device.

Session Detail Record (SDR): A record containing the accounting information for a complete session. The LSF Accounting Server creates an SDR when an accounting session is initiated. While maintaining the accounting session state, the LSF Accounting Server updates the SDR when it receives an Interim_Record from an Accounting Client. Upon session termination, the LSF accounting server updates the SDR and sends it to the NSF Accounting Server.

Start_Record: A Start_Record is used to indicate a new accounting session, and contains accounting information that is relevant to the initiation of the session.

Stop_Record: A Stop_Record is used to terminate an accounting session and contains cumulative accounting information relevant to the terminated session.

Transport Session: In a Transport Session, network resources are allocated and reserved for transport of bearer path data. A virtual packet channel path is setup and payload coding/decoding begins. Both Access Session and Service Session have associated Transport Sessions in the air interface and in the LSF. In the air interface the transport session includes the layer 2 connectivity between the mobile host and the RAN.

UAE: Usage Accounting Entry. A buffer at the RAN containing accounting data relevant to usage.

UD: A Unified Directory is a database in which various types of information associated with network is stored. This information includes the objects in the network infrastructure that consists of user profile, server locations, applications, hubs, routers, policy rules, service level agreements, etc. For an example, directories that are commonly used are based on X.500, which is an ITU standard for directories in the telecom space.

xAN: The core network is an access technology agnostic. Access Networks can be any type of access technology. Thus, xAN indicates the access network attached to the core network can be a wireless access supporting any air technology, wire line access, LAN based network or any other kind of access network. For simplicity and ease of understanding, at various places in this document radio access network (RAN) is used for an example.

NGN Accounting Management Architecture

The present invention is based on the U.S. Pat. No. 6,714,987 entitled "Architecture for an IP Centric Distributed Network" and filed on November 5, 1999, and U.S. patent application Ser. No. 09/624,066 entitled "A system and method for service session management in an IP centric distributed network" and filed on Jul. 24, 2000. These patents describe the next generation network (NGN) architecture centered on IP mobility management, call/session management, and network-management services and service session management activities respectively. Collectively, these patents provide network architecture baseline and identifies network services. An accounting management service is one of the network services coordinated between system components that monitor and record network resources used.

This section establishes context for the accounting management activities. First, an abstract level view of an NGN Accounting Management architecture model is provided in FIG. 2: NGN Accounting Management Architecture Model—Abstract level. Then, further decomposition is illustrated that distinguishes relevant accounting management system components and accounting structures. Based on these decompositions, a logical accounting interfaces are depicted that summarizes interactions between network entities and role accounting management activities. The proposed NGN Accounting architecture is flexible to adopt publicly available protocols. Additionally, the NGN architecture is flexible to collect desired accounting metrics that facilitate different service providers to adopt their specific billing schemes. For an example, the accounting management activities of the NGN architecture will measure time based or usage based metrics.

An NGN Accounting Management Architecture Model

Figure 2:
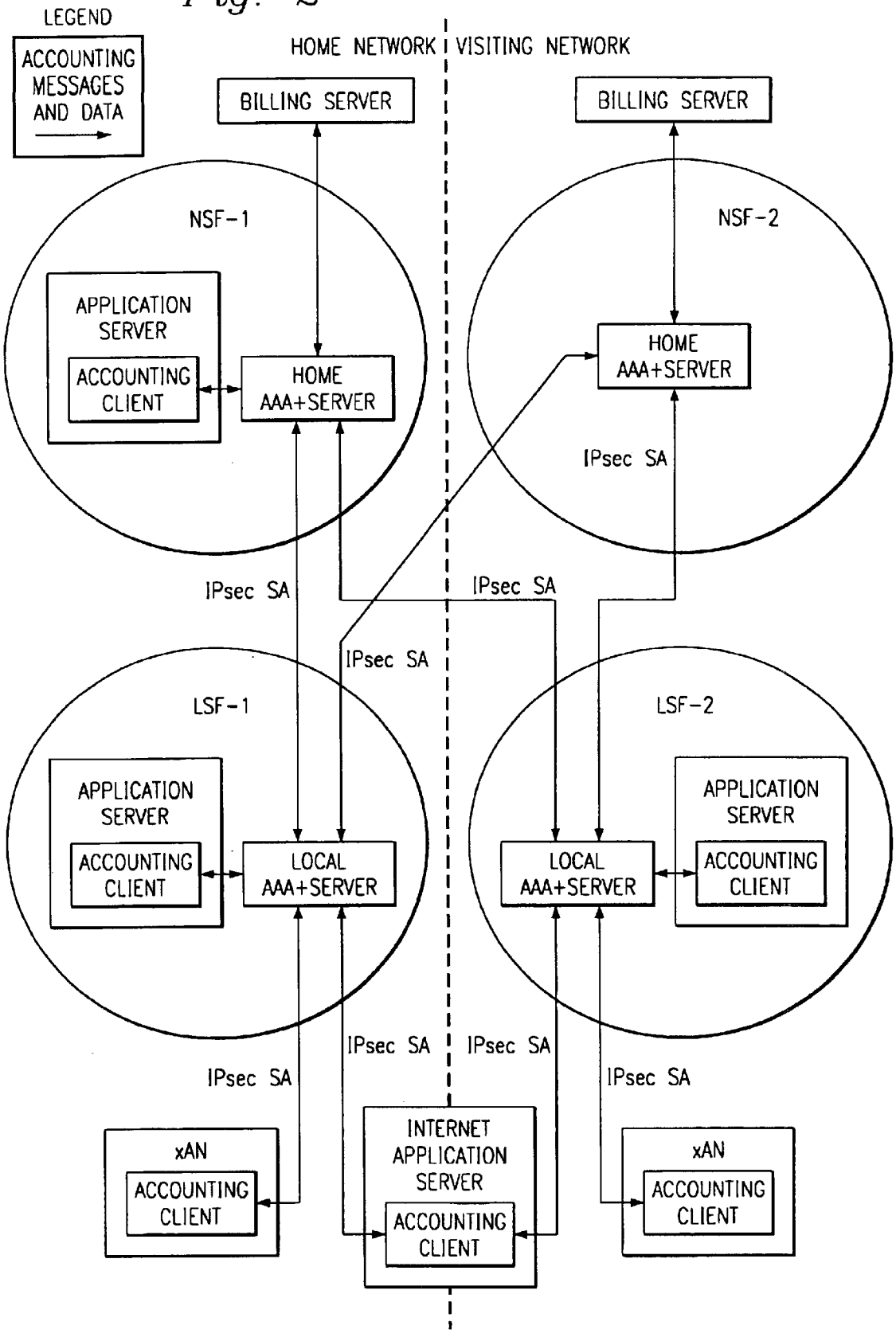
FIG. 2 illustrates an embodiment of an NGN accounting management architectural model.

The FIG. 2 illustrates an NGN accounting management architectural model. It depicts major system components and interfaces. The accounting management activities are integrated with the session management activities. The session management activities include establishment of an access session, service session, and transport session. Thus, the accounting management aspect is distributed within these sessions establishment task. Major session management functions include feature analysis, enforcement of network preferences and user capabilities, dynamic provisioning of QoS, dynamic provisioning of data rates, enforcing access restriction at the serving network, routing functions, connection types, handling of multi-media sessions, and accounting, etc.

The accounting management functional role is collectively provided, coordinated and performed by the core network functional components, core network allied service application servers and access network functional components. In order to optimize performance, these functions are distributed in different service layers and information is cached to an appropriate local decision point. Such local decision point in hierarchy has capability to provide decision enforcement.

The Accounting Clients can reside anywhere on the network possibly at the xAN, at an allied application server platform, the core network, at the end device and even on the Internet third party application server platform. The Accounting Servers can reside at the core network. The network service layer and the local service layer can have separate accounting servers based on the hierarchy and distributed control functions established by the service provider. The Accounting Server may reside at the xAN in cases where xAN is operated and owned by a different operator than LSF operator.

An activation of an accounting client takes place in several cases. Such as, at mobile host registration time and/or at service invocation time. The NGN core network's (LSF-NSF) session management functions inform the Accounting Clients of the method of data transfer based on stored policies. The LSF components establishes appropriate link with the NSF components if network has established NSF-LSF hierarchy. This data transfer method is either real-time (immediately), batch (store and forward later), or poll (send only upon request) basis.

The allied application server in association with the core network's session management functions provides the invocation of a service session. The SAE is instantiated at the allied application server. The SAE initiates SDR at the accounting server. Similarly, the service session management function initiates UAE at the xAN. The service session invocation and termination will be accounted for in the NGN LSF via the SAE of an allied application server. The service session begins when the service is invoked and ends when the service is terminated.

As discussed earlier that the NGN session management consists of 3 types of sessions: access, service, and transport. The roles of the accounting management during these sessions are described in the following paragraphs.

The Role of the Accounting Management During Access Session Establishment

The concept of default accounting session is associated with the access session establishment. During registration time appropriate default accounting configuration takes place. This activity supports an always-on characteristic of the end users in an IP centric NGN architecture. The default accounting session keeps track of network resources used in terms of pre-configured parameters (e.g. time based, packet based, etc.) at appropriate accounting clients. This allows service provider to monitor network resources used for each users even when service session is established without access service provider's intervention. Such service sessions include Internet services, access to third party application servers, etc. For Internet services or third party application services used by the always-on devices, default accounting activity will provide appropriate usage data. In this case, the end users are limited to use default network resources provided as per the subscription policy. Once appropriate network resource and accounting configuration are setup, the end-user invokes service sessions independently from the network intervention. The third party application services may establish accounting activities according to the service level agreement between end user and the application service provider.

Configure appropriate accounting entities within the distributed IP centric NGN architecture to collect, monitor, and control network usage data, and enforce accounting policies.

Collect network resource usage for the end user device from registration to deregistration (device's attachment period with the access serving network).

Enforce and control aggregate usage data with the subscription policy.

Enforce and control quality of service, class of service and bandwidth limits with the subscription policy.

An access session is instantiated at the xAN. The purpose of the access session is to provide an over-the-air interface connection between the mobile host and xAN. The access session begins when a mobile host registration occurs typically due to power-up or roaming into the local coverage area. The access session remains active at all times as long as the mobile host remains attached to the serving network. An access session ends on mobile host deregistration typically on power-down or roaming out of the local coverage area.

From an accounting point of view, the access session is tracked within the "usage accounting entry" (UAE), a buffer at the xAN accounting client used to store usage data such as channels allocated, duration of allocation, bytes transmitted, bytes received, etc. A typical UAE may contain counts for Internet service invocations. Also, when an access session is created, the method of accounting data transfer and relevant accounting policy data are made available to the xAN.

The UAE is a data structure for usage counts within the xAN memory cache. The UAE values are accumulated within a polling interval and reported to an accounting server at LSF triggered by a poll or other event. The UAE values are reset to zero to begin a new interval.

The access UAE also known as "default access UAE" is specific to a single MH. It is created during access session establishment and deleted on access termination. The access UAE tracks network usages such as bandwidth, duration etc.

The Role of the Accounting Management During Service Session Establishment

Each service session established for the end user through the network requires appropriate accounting for the network resources used. The service sessions established using serving network services and using network allied application services (servers) require additional accounting activities other than default accounting setup that is established during access session. For such services, an accounting client configuration may be setup at the access network and at the network allied application servers depending on the accounting policy requirements for the subscribers. The main objective is to configure appropriate accounting entities within the distributed IP centric NGN architecture to collect; monitor, and control network usage data, and enforce accounting policies.

Services provided to the end user can be provided by an allied application server in association with the core components (LSF-NSF components) or core network independent third party application servers in the publicly available Internet. The next section describes these services.

Services Invoked with an Allied Application Server in Association with the Core Network The purpose of such service session is to provide and coordinate a value added services to an end user. The core network components provide network services as identified in "A System and Method for Service Session Management in An IP Centric Distributed Network". An accounting service is one of the network services provided during service session establishment.

The service session begins when an end user invokes the service. The service session ends when an end user (or terminating party) ends the service.

From an accounting point of view, the service session creates the "service accounting entry" (SAE), a buffer at an allied accounting client used to store service data such as type of service invoked, QoS requested, QoS granted, duration, etc. A typical SAE will contain data for a single service from beginning to end. Since a service session also involves usage at the xAN, a separate UAE in the xAN is also created for each service session. This service session UAE is different than the default access UAE described above. This allows the accounting architecture to report usage measurements specific to a service session.

An each service session SAE created at an allied application server is specific to a service session invoked from a MH. An associated UAE created at the access network for a service session, tracks air bandwidth usage for the MH. When the user accesses the NGN network, the service session SAE is updated to accumulate usage counts. The Accounting Client is expected to map a service session UAE to a xAN port number or terminating IP address in order to facilitate the measurement of service usage data.

Internet Services—Services Invoked with an Application Server not in Association with the Core Network Internet-provided services invocation and termination will be accounted in the default accounting session established during access session establishment. Core components (LSF and NSF) are not involved in providing such services. However, access network usages are captured in UAE established based on provided default network resources. Other than usage, it is not a requirement at this time to account for each Internet directed transaction and reply. Examples of these services include web browsing, MP3 downloads, data searches, etc.

For the Internet service, the session start and end requires a broader interpretation. For example, it is very difficult to determine when a session has started or ended when a user is browsing the web in an "always on" environment.

The invocation of a service provided on the Internet will require the use of radio resources for wireless transmission. Usage will be accounted in default accounting session in UAE that is established during access session establishment.

For the third party application services provided via publicly available Internet, an default accounting session is defined as an "access session" beginning at registration time and ending at de-registration time.

The Role of the Accounting Management During Transport Session Establishment

The purpose of the transport session is to allocate/reserve network resources and transmits bearer path data. A transport session is created by either an access session or service session. For example, in case of access session, when a mobile host begins a web browsing activity, the access session at the xAN creates a transport session from the mobile host IP address to the requested web server, providing end-to-end connectivity. However, network resources provided are limited to the default parameters setup at the access session establishment. Similarly in case of service session, when a mobile host requests a SIP telephony service from an allied application server, the core network components facilitate requested transport session from the mobile host IP address to the terminating IP address, providing end-to-end connectivity. The transport session begins when instantiated by the service session. The transport session ends when the service session de-allocates the network resources required.

From an accounting point of view, the transport session updates the corresponding UAE, a buffer at the xAN used to store xAN usage data such as channels allocated, duration of allocation, bytes transmitted, bytes received, etc.

Accounting Components and Logical Interfaces

Figure 3:
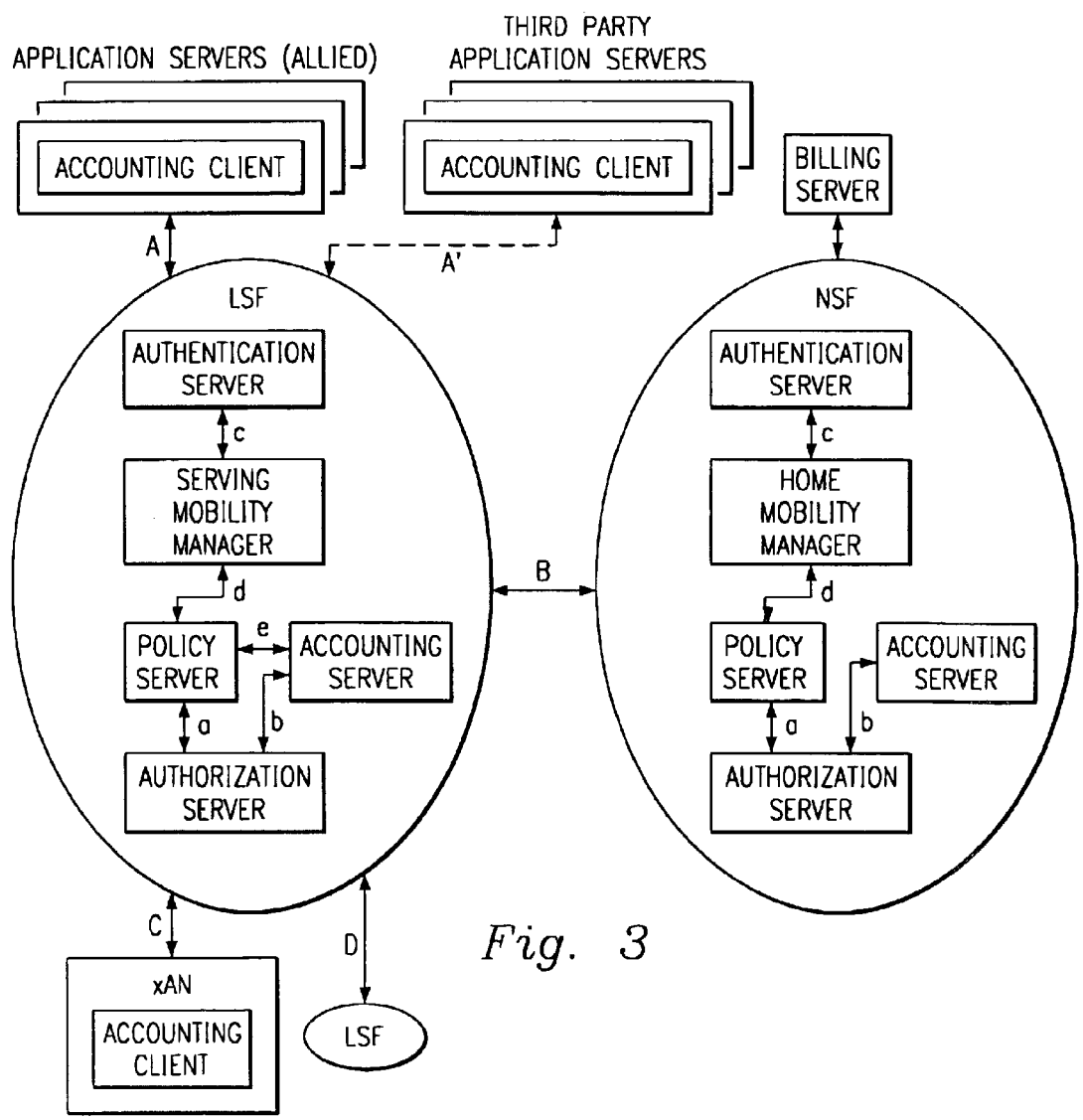
FIG. 3 illustrates an embodiment of the accounting logical interfaces between the NGN components.

The logical accounting interface model and accounting components illustrate the primary accounting control interfaces in the NGN architecture. The Accounting logical interfaces between the NGN components are shown in FIG. 3.

Accounting Components: Accounting Client

The Accounting Client is responsible for the collection of resource consumption data. This data is stored in the UAE or SAE buffer (described previously). The Accounting Client is also responsible for reporting the accounting data to the Accounting Server. The transfer of the data to the Accounting Server is accomplished by using the DIAMETER accounting protocol.

The NGN architecture is very flexible regarding the location of the Accounting Clients. In general, an Accounting Client can reside anywhere on the network. Unless residing in the same LSF, the Accounting Client is required to establish an IPSec secure association with the Accounting Server to transfer data. The most typical locations of an Accounting Client will be in the xAN as provider of the access (e.g., air) interface and in the Core network allied application server as provider of the specialized service provider services.

The Accounting Client can reside in an Application Server in the Internet that collects and reports real-time accounting data to an Accounting Server in the LSF as shown in FIG. 2.

This architecture proposes that the Accounting Clients have three main functions:

1) Event Detection Function: detects or is informed of events that are significant to accounting. Forwards events to the Record Collection Function.
2) Record Collection Function: based on the type of accounting collection model being used, makes the decision to either store the event in the UAE (an entry in the local cache) for batch transfer at a later time, or to send the event to the Record Transfer Function for immediate real-time transfer to the LSF Accounting Server.
3) Record Transfer Function: uses DIAMETER protocol to transfer blocks of accounting records from the Accounting Client to the LSF Accounting Server.

LSF & NSF Accounting Server

Accounting Servers are located at the Local Serving Function (LSF) and at the Network Serving Function (NSF). If a network is comprised of an integrated LSF and NSF, there need only be one single Accounting Server.

The LSF Accounting Server processes the accounting data received from the Accounting Client. The LSF Accounting Server takes the accounting data from the publicly available protocol (e.g. DIAMETER message) messages and creates/updates/deletes the Session Detail Record (SDR) on local disk. This processing may include summarization of interim accounting information, elimination of duplicate data, and/or routing of session detail records (SDR) upon completion.

Once the accounting data for the session is complete, the accounting data is routed to the user's home NSF Accounting Server using an IPsec secure association. This approach, supports roaming between service providers' networks. After routing to the NSF Accounting Server, the SDRs are held locally for a configured time to assist in data recovery if required.

Billing Server

The Billing Server typically handles rating and invoice generation, but may also carry out auditing, cost allocation, trend analysis or capacity planning functions. The Billing Server description is beyond the scope.

Policy Server

An object in the network that maintains and provides subscriber profile and policy rules. It reads this information from the database via LDAP interface and distributes policy rules to the routers in the networks and xAN.

Accounting Logical Interfaces

A Interface: This interface is used for the communication between the allied service application server and the LSF components. For the accounting the IETF AAA DIAMETER protocol can be used for this interface.

A Interface: This interface is used for the communication between the third-party application servers and the LSF components. For the accounting, the IETF AAA DIAMETER protocol can be used for this interface.

B Interface: During the access session establishment, this interface is used to transfer the user's policy information (including accounting policies) from NSF to the LSF components. The IETF Mobile IP or IP Mobility protocol can be used between LSFs to carry the accounting policies at the access session establishments. During an access session or service session, the accounting data are captured in SDRs in the LSF and transferred to the NSF. For the SDR transfer function in this interface, the IETF AAA DIAMETER protocol can be used.

C Interface: This interface is used for the communication between xAN and the LSF components. For the accounting function, this interface is used to transfer the accounting policy information from LSF to the xAN accounting client during an access session establishment. During a session, the accounting records (e.g. Start_Record) are transferred from xAN to the accounting server in the LSF. The IETF AAA DIAMETER protocol can be used between the Accounting Server in LSF and the accounting client in xAN.

D Interface: Inter-LSF communications happens normally during handoffs. During handoffs the accounting policy is transferred form the old LSF accounting components to the new LSF accounting components. For handoffs, the IETF Mobile IP or IP Mobility protocol can be used between LSFs.

a & b Interfaces: The core network accounting components provide the role of accounting function for sessions and facilitate accounting services such as obtaining accounting policies and enforcement of accounting policies, service authorization, service usage reporting, QoS usage reporting, etc. The IETF Common Open Policy Service (COPS) protocol (RFC 2748) can be used between the Policy Server and Authorization Server ("a" interface). The IETF AAA DIAMETER protocol can be used between the Accounting Server and Authorization Server ("b" interface).

Accounting Configuration During Session Establishment

During the access session and service session, accounting usage data are captured in SDR in the LSF accounting server. Subsequently, these data are transferred to the NSF accounting servers. The IETF AAA DIAMETER protocol can be used between the LSF and NSF accounting servers, accounting client in xAN, accounting client in allied application server and the LSF accounting server.

Accounting Configuration During Access Session Establishment:

The access session begins when a mobile host registration occurs typically due to power-up or roaming into the local coverage area. The accounting configuration for an access session establishment is described below:

A Registration message is sent from xAN to the Serving Mobility Manager (SMM)

The SMM sends an Authentication request to the local AAA Authentication Server

The local AAA Authentication Server sends a Auth_ Request to the NSF Authentication Server The user is authenticated and the response is sent back to the SMM SMM sends a Registration message to the Home Mobility Manager (HMM) via the local AAA server in LSF and home AAA server in NSF HMM retrieves the user's profile, relevant policy rules (including accounting policies) and sends them to the SMM at the LSF SMM updates the policy rules at the local policy server in the LSF The SMM sends a Registration_Reply message to the xAN. This message carries relevant policy information (includes accounting) and user's profile The default access UAE is created by the accounting client at the xAN The accounting client sends DIAMETER Accounting Request carrying the Start-Record message.

The Accounting Server at the LSF opens a new SDR for the access session. This SDR will be updated when the Interim-Records are received during the access session.

Accounting Configuration During Service Session Establishment

The service session begins when the user invokes the service. The accounting configuration that takes place during service session establishment is described below:

An end user invokes a service session. The request is routed to the IP address of the allied application server to which the service is configured during the Registration sequence. The service session request message contains the service type, the QoS requested, and the bandwidth requested for the session.

The allied Service Application Server sends an Authorization Request message to the AAA server to authorize the service, QoS, and bandwidth requested.

The Authorization Server consults the local Policy Server to authorize the service, QoS, and bandwidth requested. The reply to this message contains the Accounting Model Indicator.

When the request is authorized, the Authorization Server sends the Authorization Response to the allied Service Application Server.

The Service Application Server instantiates the SAE. The service session management function of the core network (either through the allied service application server or directly from the core network component) configures xAN for the relevant resources Such configuration includes the "Accounting Model Indicator" information identifying the collection method for the requested service. If the Accounting Model Indicator is not provided then the Accounting Client at the xAN will use a configured default indicator. The response to this configuration contains the Accounting Session ID generated by the xAN Accounting Client.

The Connection Manager at the xAN sends the "service session invoked" event to the Accounting Client. Included in the event is the Accounting Model Indicator identifying how to store and transfer accounting records specifically for this service. At this point, the Accounting Client creates a service session UAE specifically for tracking usage for this service session.

Accounting Structures and Interactions

Figure 4:
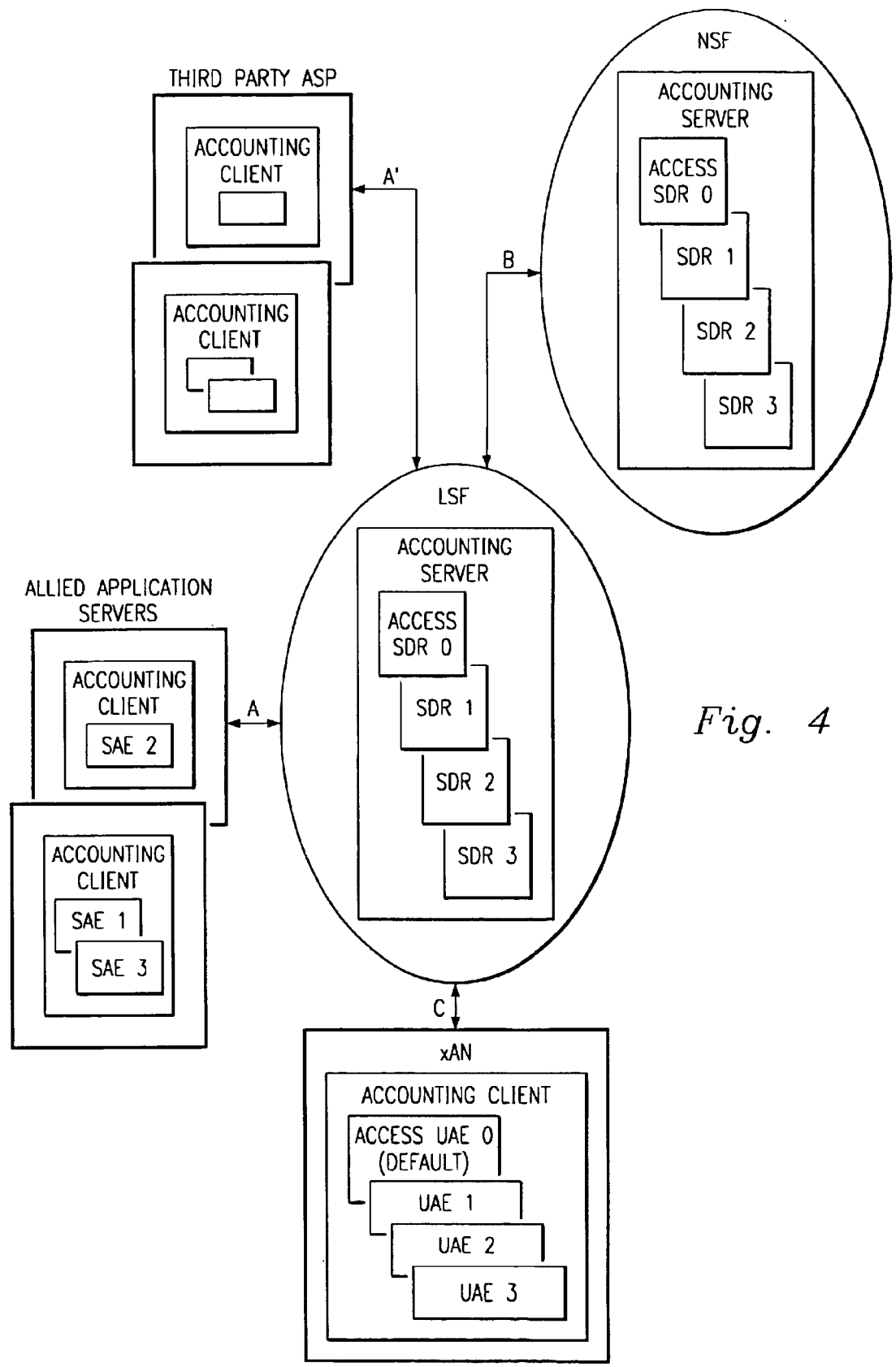
FIG. 4 illustrates an embodiment of Accounting Structures.

The FIG. 4: Accounting Structures illustrates accounting structures, location where instantiated. Further in section their interactions are described.

Accounting Structures: Usage Accounting Entry (UAE)

From an accounting point of view, session activity is tracked within the "usage accounting entry" (RAE), a buffer at the xAN accounting client that is used to store usage data such as channels allocated, duration of allocation, bytes transmitted, bytes received, etc. The UAE is instantiated for access session and each service session invoked using allied application servers. Policy information relevant to the accounting collection and reporting method is configured at the xAN when an access session is established. Similarly, during service session establishment or/and dynamic change of QoS update, appropriate policy information is, made available at the xAN.

The UAE is a data structure for usage counts within the xAN memory cache. The UAE values are accumulated within a polling interval and reported to an accounting server triggered by a poll or other event. The UAE values are reset to zero to begin a new interval.

The access UAE also known as "default access UAE" is specific to a single MH. It is created during access session establishment and deleted on access termination. The UAE instantiated for service sessions records usage data for each specific service.

Service Accounting Entry (SAE)

From an accounting point of view, the service session creates the "service accounting entry" (SAE), a buffer at the LSF accounting client used to store service data such as type of service invoked, QoS requested, QoS granted, duration, etc. A typical SAE will contain data for a single service from beginning to end. Since a service session also involves usage at the xAN, a separate UAE in the xAN is also created for each service session. This service session UAE is different than the default access UAE described above. This allows the accounting architecture to report usage measurements specific to a service session.

Session Detail Record (SDR)

A session detail record is instantiated at the LSF Accounting Server for each session. It contains accounting data that represents a session in progress or a completed session. When the LSF Accounting Server is informed that the session is complete, it makes a final update of the SDR and then transfers the SDR to the NSF Accounting Server.

The NGN architecture must allow for single and multiple SDR records to represent a session. To support deployment of wireless access and IP mobility in the NGN, it may be necessary to generate multiple SDRs from a single session when certain events occur during a session.

In mobile access networks the user may roam from one serving area to another while still being connected in the same session. If roaming causes a change in the tariffs or requires the use of a different accounting server, it is necessary to account for resource consumed in the first and second serving areas via multiple SDRs. To affect this, the Accounting Client would complete the session associated with the first serving area resulting in the first SDR being completed. The Accounting Client in the new serving area would begin a new session. Eventually the second session will complete resulting in the second SDR being completed. Again, all of these activities are required to take place transparently to the user.

Another example of where multiple SDRs may be necessary is when QoS modifications are allowed to an ongoing session. For example, it is possible that a session could be re-authorized with improved QoS. This would require transparent production of separate SDRs identifying both QoS levels for accurate billing.

The "Accounting Session ID" is proposed as a globally unique identifier to be present in the SDRs to permit the service provider billing systems to combine the multiple SDRs together giving an end-to-end view for session duration and billing purposes. The Accounting Session ID is unique throughout the entire global network and allows for combining of multiple SDRs at a downstream Billing Server when the situations described above occur. The Accounting Client creates the Accounting Session ID when a session is started.

In conclusion, in some cases it is necessary to produce multiple SDRs for a single session. It must be possible to do this without requiring the user to start a new session or to re-authenticate.

The NSF Accounting Server consolidates all of the completed accounting data from the LSFs onto persistent disk data storage.

The accounting data stored on the NSF disk will eventually be sent to a billing server via file transfer protocol. Session detail records may be batched and compressed by the NSF Accounting Server prior to submission to the billing server in order to reduce the volume of accounting data and the bandwidth required to accomplish the transfer. After routing to the Billing Server, the SDRs are held locally for a configured time to assist in data recovery if required.

Accounting Structure Interactions: Accounting Structure Interactions During Access Session When an access session is established, an access UAE (UAE 0 in FIG. 4) is instantiated in the xAN. This UAE holds the data usage information such as packet counts and QoS level used for duration of the accounting data transfer interval. Then the accounting client in xAN sends an accounting Start-Record message to the Accounting Server in the LSF. This message carries billg information such as user's address, QoS (data rate) granted, etc. Then the Accounting Server in the LSF allocates the "access SDR 0" and updates other SDR's related fields.

Through out the access session the usage information such as data counts and QoS level are captured and stored by the accounting client in the xAN. The accounting client in xAN sends an accounting Interim-Record message to the Accounting Server in LSF on transfer intervals. This message(s) carries the usage information for the duration of an interval. The accounting server updates the access SDR 0 with the usage information when receives the Inter-records Upon termination of an access session, the accounting client at the xAN de-allocates the access UAE 0 and sends an accounting Stop-Record to the accounting server. The accounting server updates the access SDR 0 and sends it to the NSF.

Accounting Structure Interactions During Service Session

When a service session is established, an SAE is instantiated in an allied service application server. Also a corresponding UAE is configured at the xAN. The SAE holds the accounting information for the service such as user's address, Service info, QoS (data rate) granted, etc. Then the accounting client in the allied Service Application Server sends an accounting Start_Record message to the Accounting Server in the LSF. This message carries billing information such as user's address, Service information, QoS (data rate) granted, etc. The corresponding UAE in xAN, holds the data usage information such as packet counts, time and QoS level used for duration of the accounting data transfer interval. Upon reception the Start_Record, the Accounting Server in the LSF instantiates a SDR and updates related fields.

During the service session the usage information such as data counts and QoS level are captured and stored by the accounting client in the xAN corresponding to the service session UAE. Then the accounting client in xAN sends accounting Interim_Record message to the; accounting Server in LSF on transfer intervals. This message(s) carries the usage information for that service for the duration of an interval. The accounting server updates the corresponding SDR with the usage information when receives the Inter-records.

Upon termination of the service session, the accounting client in the allied Service Application Server de-allocates corresponding SAE and sends an accounting Stop_Record to the Accounting Server at the LSF. An Accounting Server updates the corresponding SDR and sends that SDR to the NSF.

Accounting Collection Models

Several data collection models are proposed by the IETF for the purpose of reporting accounting data. These models are briefly described here for ready reference. They are as follow:
Polling model
Event-driven polling model
Event-driven model without batching (real-time)
Event driven model with batching The NGN accounting architecture is flexible enough to support all of the above models for reporting of accounting data.

Accounting Model Indicator

The Accounting Model Indicator identifies to the Accounting Clients how to transfer accounting data to an accounting server. This value indicates the collection model to be used.

The accounting model indicator is given to the Accounting Client in two ways:

1) Authorization server directed model: This occurs during service session invocation from the end user via core network allied application server. At service authorization time, the Authorization Server will access the user policy including the accounting policy. After receiving the authorization response, the core network or core network in association with allied application server sends a resource request to the access network for resource reservation. This request includes the Accounting Model Indicator and hence the Accounting Client is notified. An accounting client instantiates UAE for requested service session. A separate UAE is instantiated for each service session invoked.

2) Local policy directed model: This occurs during the initial system access session establishment time. During registration, the serving mobility manager configures the access network enforcement point with the default accounting related and user policy (at local policy enforcement point). Subsequently, an accounting client is informed with the appropriate Accounting Model Indicator. An accounting client instantiates UAE 0 corresponding to an access session.

Figure 5:
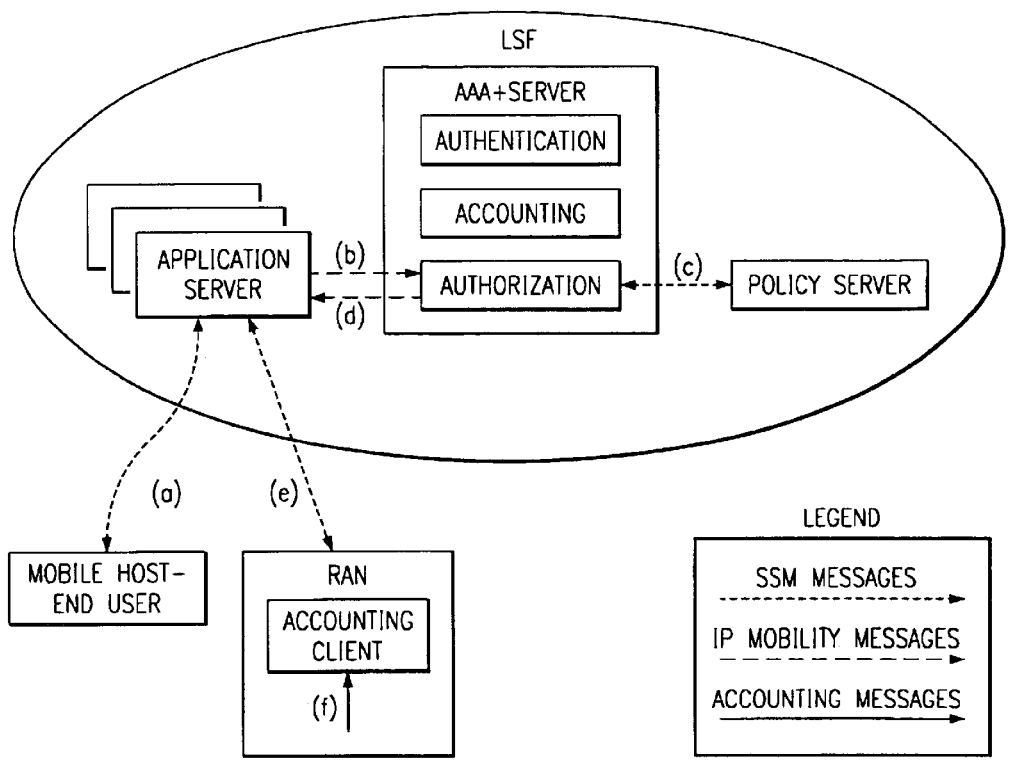
FIG. 5 illustrates an embodiment of an Accounting Model Indicator Establishment on Service Session Invocation.

The FIG. 5: Accounting Model Indicator Establishment on Service Session Invocation describes steps that take place in the NGN accounting architecture during service session establishment. For brevity, steps taken during access session establishment are not shown. However, in this case, serving mobility manager instead of allied application server transfers policy and "Accounting Model Indicator" details to the accounting client at the access network.

Accounting Model Indicator Establishment on Service Session Invocation

This scenario demonstrates the establishment of the Accounting Model Indicator for an LSF service requested by the mobile host. As described previously, the Accounting Model Indicator defines the collection model for accounting data (polling, event-driven polling, event-driven without batching, event-driven with batching). The service session is facilitated in an Application Server in the LSF.

a) The MH invokes a service session. The request is routed to the IP address of the application server for which the service is configured during the Registration sequence. The session request message contains the service type, the QoS requested, and the bandwidth requested for the session.

b) The Application Server sends an Authorization Request message to the AAA server to authorize the service, QoS, and bandwidth requested.

c) The Authorization Server consults the local Policy Server to authorize the service, QoS, and bandwidth requested. The reply to this message contains the Accounting Model Indicator.

d) When the request is authorized, the Authorization Server sends the Authorization Response to the Application Server in the LSF.

e) The Application Server creates the SAE. Then, the Application Server (or another LSF session management component) sends a Resource Reservation Request message the Connection Manager in RAN. This message contains the Accounting Model Indicator information identifying the collection method for the requested service. If the Accounting Model Indicator is not included on this message, the Accounting Client will use a configured default indicator. The response to this request contains the Accounting Session ID generated by the RAN Accounting Client.

f) The RAN Connection Manager sends the "service session invoked" event to the Accounting Client. Included in the event is the Accounting Model Indicator identifying how to store and transfer accounting records specifically for this service. At this point, the Accounting Client creates a service session UAE specifically for tracking usage for this service session.

Note: Start_Record message and SDR creation at the LSF is covered in the scenario "ISF Service Session Accounting".

Accounting Model Indicator Establishment on Access Session Invocation

This scenario demonstrates the establishment of the Accounting Model Indicator for an access session. As described previously, the Accounting Model Indicator defines the collection model for accounting data (polling, event-driven polling, event-driven without batching, event-driven with batching).

Polling Model

In the polling model, the Accounting Server will initiate the data retrieval by polling the Accounting Client. The DIAMETER Accounting-Poll-Ind command is sent by the Accounting Server in order to force the accounting clients to send current accounting data. In this model, the Accounting Client simply stores the accounting data locally until requested to send it via a response to the poll. Of course, appropriate error handling conditions within the Accounting Client (local UAE cache full, fault threshold exceeded, etc.) may cause the upload of this data prior to a scheduled poll.

The polling model is used primarily in two situations:
1. The Accounting Server is configured to poll each Accounting Client on a regular basis (e.g. once every 10 minutes).
2. In order to ensure against possible loss of data, the Accounting Server comes up after an unscheduled downtime and requests to synchronize with the Accounting Client(s) sooner than at the end of the next Interim_Record or at the end of a session.

Event-Driven Polling Model

In the event-driven polling model, the Accounting Server will poll the Accounting Client only when it receives an event. An Accounting Client generates the event. Examples of these events are: a batch has reached a certain size limit, data of a certain type is now available (I.e. end of session), or a minimum time period has elapsed.

Event-Driven Model without Batching (Real-Time)

In the event-driven model without batching, the Accounting Client sends the accounting data to the LSF Accounting Server immediately upon event detection. The data is not stored locally within the Accounting Client except in the case of an error condition (ISF Accounting Server down, IPSec association denied, etc.). The event-driven model without batching will most likely be used in support of roaming and real-time billing scenarios (also known as "hot billing").

Event-Driven Model with Batching

In the event-driven model with batching, the Accounting Client stores the accounting data locally within a memory cache. The Accounting Client detects events, which trigger the upload of this batch of data. These events include time interval elapsed, memory cache threshold exceeded, or data of a certain type is now available. The batch of data consists of multiple records, specifically UAEs or SAEs. Each record represents an ongoing or completed session.

Accounting Messages

In general, each session within the NGN accounting architecture is captured via the following DIAMETER message sequence:
START_Record followed by
0 . . . n INTERIM_Records followed by
STOP_Record These messages are sent from the Accounting Clients to the LSF Accounting Server. Please note that the Accounting Clients locations are assumed at the access network that provides measured data. However, if the measured data are independent of the access network and associated application server provides such measured data, then Accounting Clients are assumed to reside at the application server.

The START_Record is sent to indicate the beginning of a session requiring accounting. Upon receipt, the LSF Accounting Server creates the initial instance of the SDR specific to this session.

As usage data is accumulated at the xAN, the INTERIM_Record is used to report this to the LSF Accounting Server on an immediate or polled basis. The values within the INTERIM_Record represent usage counts for the duration of one interval only. The LSF Accounting Server takes the values from the INTERIM_Record and accumulates them into the SDR.

The STOP_Record is used to indicate the end of a session requiring accounting. The STOP_Record can include the counts representing the usage occurring from the start of the current interval to the session end time. The LSF Accounting Server updates the SDR specific to this session and then sends the SDR to the NSF Accounting Server signifying a completed session.

Figure 6:
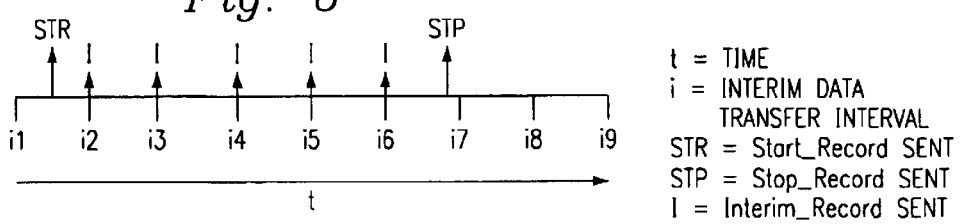
FIG. 6 illustrates an embodiment of a Usage Reporting Mechanism.

As DIAMETER supports multiple records within a single message, these records are typically encapsulated within a DIAMETER message called ACCOUNTING_REQUEST. The FIG. 6: Usage Reporting Mechanism shows the Start_Record and Stop_Record of a session with the Interim_Record transfer intervals.

Accounting Events and Actions

The following table shows events that cause actions to be taken within the NGN accounting architecture:

| Events | Accounting Actions |
|---|---|
| Access session established | Default UAE created at the xAN indicating default allocated resources
Accounting Model Indicator sent to xAN
START_Record sent from xAN to LSF Accounting Server
SDR created at LSF Accounting Server |
| Access session ended | Stop_Record with final usage data from default UAE sent to LSF Accounting Server
Default UAE de-allocated in xAN
SDR updated at LSF Accounting Server (to be de-allocated at a later time)
SDR sent from LSF Accounting Server to user's home NSF Accounting Server*
SDR stored at user's home NSF Accounting Server |
| Service session invoked | SAE created at Core network allied application server indicating allocated resources
START_Record sent from Core network allied application server to LSF Accounting Server
SDR created at LSF Accounting Server
Accounting Model Indicator sent to xAN
Service session UAE created at the xAN to track usage specific to this session |
| Service session ended | Service session UAE final usage date obtained from xAN
Service session UAE de-allocated in xAN
STOP_Record with final data from SAE and UAE sent to LSF Accounting Server
SAE de-allocated in Core network allied application server
SDR updated at LSF Accounting Server (to be de-allocated at a later time)
SDR sent from LSF Accounting Server to user's home NSF Accounting Server*
SDR stored at user's home NSF Accounting Server |
| Transport session packets sent/rcvd | Default UAE or service session UAE updated in the xAN |
| Interim data poll or trigger | Interim_Record message (UAE batch) sent from xAN to LSF Accounting Server
SDRs updated with interim data at LSF Accounting Server
All UAE counts reset to zero in the xAN |
| QoS update during service session | STOP_Record with original QoS usage data from UAE sent to LSF Accounting Server
Old service session UAE de-allocated at the xAN
SDR updated at LSF Accounting Server (to be de-allocated at a later time)
SDR sent from LSF Accounting Server to user's home NSF Accounting Server*
SDR stored at user's home NSF Accounting Server
new service session UAE created at the xAN to track usage specific to this new QoS session
START_Record for new QoS session sent from xAN to LSF Accounting Server
SDR created at LSF Accounting Server with same Accounting Session ID |
| QoS update during Internet session | UAE created at the xAN to track usage specific to this new QoS session
START_Record for new QoS session sent from xAN to LSF Accounting Server
SDR created at LSF Accounting Server with same |

-continued

| Events | Accounting Actions |
|---|---|
| | Accounting Session ID |
| Handoff from xAN-1 to xAN-2 (same LSF) | INTERIM_Records with usage data from xAN-1 sent to LSF Accounting Server<br>SDR updated LSF Accounting Server<br>UAE at xAN-1 de-allocated<br>UAE created in xAN-2 for session with same Accounting Session ID |
| Handoff from LSF-1 to LSF-2 | STOP_Record with usage data from UAE-1 sent to LSF-1 Accounting Server<br>UAE at xAN-1 de-allocated<br>SDR updated at LSF Accounting Server (to be de-allocated at a later time)<br>SDR sent from LSF-1 Accounting Server to user's home NSF Accounting Server*<br>SDR stored at user's home NSF Accounting Server<br>UAE-2 created in new xAN for LSF-2 session<br>START_Record for session sent from new xAN to LSF-2 Accounting Server<br>SDR created at LSF-2 Accounting Server with same Accounting Session ID |

*covers roaming scenarios

Objects and Attributes Collected

This section describes the proposed objects that are recommended for accounting measurement at the xAN and LSF. Additionally, a preliminary attempt at the attributes for each object is offered. These objects and associated attributes provides generic framework and can be altered as needed.

It should be noted that the NGN Accounting architecture is not directly dependent on the type and structure of data to be collected. The architecture is intended to be flexible to work for any type of data structures, just as the DIAMETER protocol supports any message structure within the messages themselves.

NGN Accounting Objects

The objects that are recommended for accounting measurement at the xAN and LSF components align with the architectural concepts associated with sessions:

Access
Service

As the transport of data is aligned with an access session or service session, a separate object representing this is not necessary. Instead, the packet transport details are encompassed within the access object and service object. It is possible however, to define a separate Transport object that is inheritable from the Access and Service objects.

| OBJECT ATTRIBUTES | |
|---|---|
| Object: Access Attributes | |
| Number of channels used | (* set on access session creation *) |
| Data rate requested | (* set on access session creation *) |
| Data rate provided | (* set on policy decision *) |
| QoS level requested | (* set on access session creation *) |
| QoS level granted | (* set on policy decision *) |
| Number of bytes transmitted | (* updated on outgoing traffic burst *) |
| Number of bytes received | (* updated on incoming traffic burst *) |
| Number of packets transmitted | (* updated on outgoing traffic burst *) |
| Number of packets received | (* updated on incoming traffic burst *) |
| Active duration | (* updated with time that MH is in "active" state *) |
| Dormant duration | (* updated with time that MH is in "dormant" state *) |
| Idle duration | (* updated with time that MH is in |

-continued

| OBJECT ATTRIBUTES | |
|---|---|
| | "idle" state *) |
| Termination cause | (* updated on access session end *) |
| Start timestamp | (* set on access session creation *) |
| End timestamp | (* set on access session end *) |
| Accounting session ID | (* set on access session creation *) |
| Object: Service Attributes | |
| Service type | (* set on service session creation *) |
| QoS level requested | (* set on service session creation *) |
| QoS level granted | (* set on policy decision *) |
| Number of bytes transmitted | (* updated on outgoing traffic burst *) |
| Number of bytes received | (* updated on incoming traffic burst *) |
| Number of packets transmitted | (* updated on outgoing traffic burst *) |
| Number of packets received | (* updated on incoming traffic burst *) |
| Termination cause | (* updated on service session end *) |
| Start timestamp | (* set on service session creation *) |
| End timestamp | (* set on service session end *) |
| Accounting session ID | (* set on service session creation *) |

Data Loss Prevention

Accounting data is arguably the most important data on the network to the service provider. Safeguards must be in place to help ensure the integrity and survivability of all accounting records.

The NGN Accounting architecture makes the following recommendations to help guarantee no loss of accounting data:

Accounting Clients use non-volatile RAM for UAE and SAE cache. This allows the accounting data within the client to survive a reboot situation.

Accounting Clients de-allocate UAE and SAE only after receiving a positive response from the LSF Accounting Server indicating successful transfer of the data. These responses from the Accounting Servers are assumed and not shown within the scenarios.

LSF Accounting Server stores SDRs on local disk for a configurable time even after successfully sending to the NSF Accounting Server. This allows for data recovery in the event of a disaster situation at the NSF.

NSF Accounting Server stores SDRs on local disk for a configurable time even after successfully transferring the file to the Billing Server. This allows for data recovery in the event of a disaster situation at the Billing Server.

All Accounting Servers at the LSF and NSF use mirrored disks. This guards against data loss in the event of a disk crash.

All Accounting Servers require an IPSec secure association to help prevent against fraud and hacking. The only exception might be a local LSF Accounting Client interfacing to the LSF Accounting Server on a secure firewall self-contained intranet.

This section provides several example scenarios that describe the accounting management activities that take place within the NGN architecture, using techniques discussed earlier. These scenarios are grouped in three parts; covering "Registration & Deregistration for access session", "Invocation of service session through allied application servers", and "Invocation of Internet service (through third party application servers)" respectively. Please note that a Radio Access Network is used in some instances as an example that represents access network.

Figure 7:
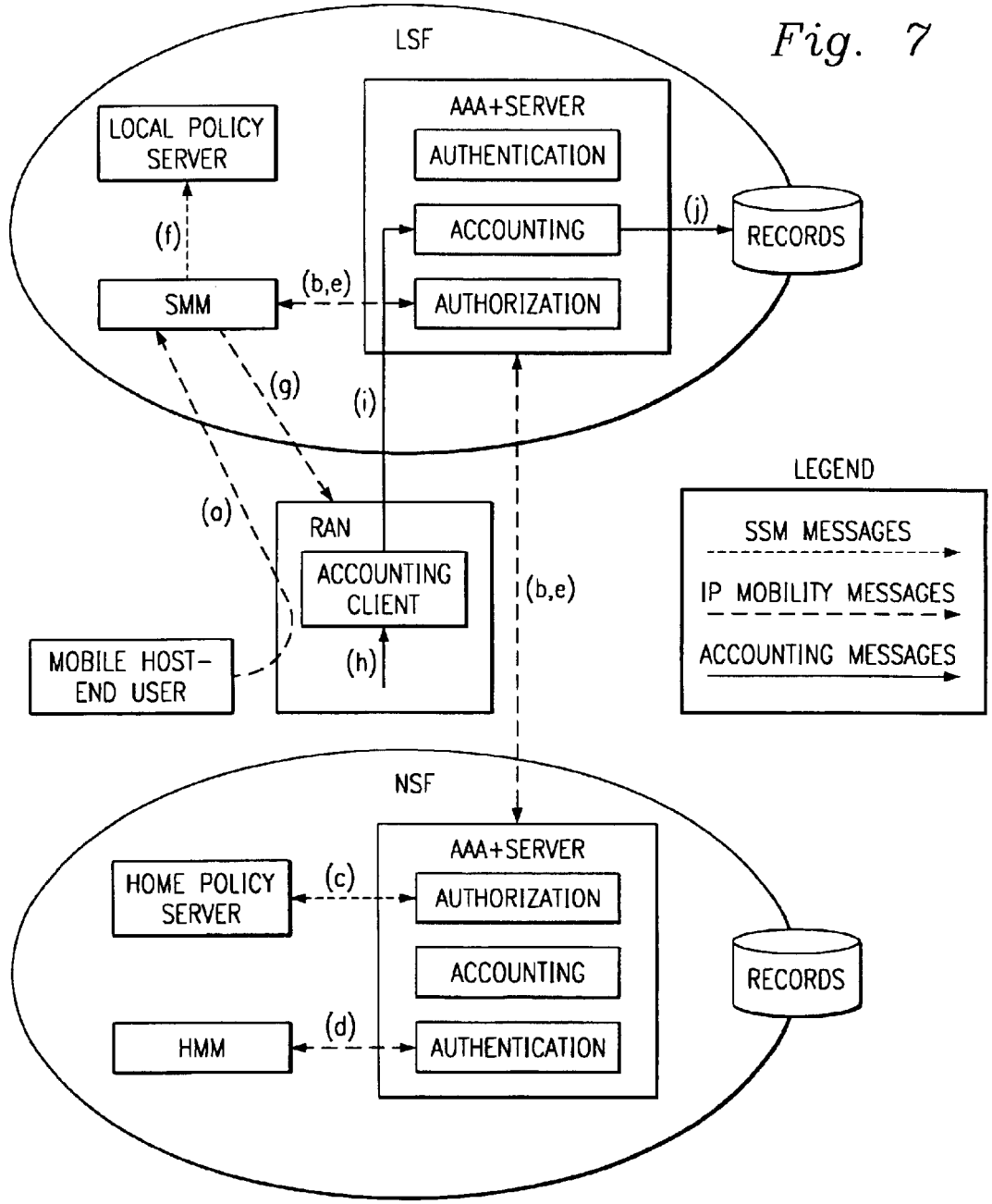
FIG. 7 illustrates an embodiment of an Access Session Accounting for Registration.

Registration & Deregistration for Access Session: Access Session Accounting for Registration This scenario demonstrates the accounting activities on MH registration. The two main activities shown are the establishment of the Accounting Model Indicator within the access network (e.g. RAN) and the sending of the Start_Record to the LSF Accounting Server. As described previously, the Accounting Model Indicator defines the collection model for accounting data (polling, event-driven polling, event-driven without batching, or event-driven with batching). The FIG. 7: Access Session Accounting for Registration describes each step that takes place during this process.

- a–g) The Initial System Access procedure including Authentication, Registration and policy download, is performed during the access session establishment.
- h) The Registration Reply message received by the RAN in step (g) includes the policy and Accounting Model Indicator. When the IP session between the MH and xAN is established using the granted QoS and bandwidth the "access session established", the RAN-Connection Manager sends event to the Accounting Client. Included in the access session established event is the Accounting Model Indicator identifying how to store and transfer accounting records. At this point the Accounting Client instantiates a local representation of the accounting session in the form of a default UAE.
- i) The RAN Accounting Client creates the DIAMETER Accounting_Request message of type Start_Record and sends it to the LSF Accounting Server. This message indicates the beginning of an access session.
- j) The LSF Accounting Server creates an initial SDR and stores it on local disk.

Access Session Accounting for Deregistration

Figure 8:
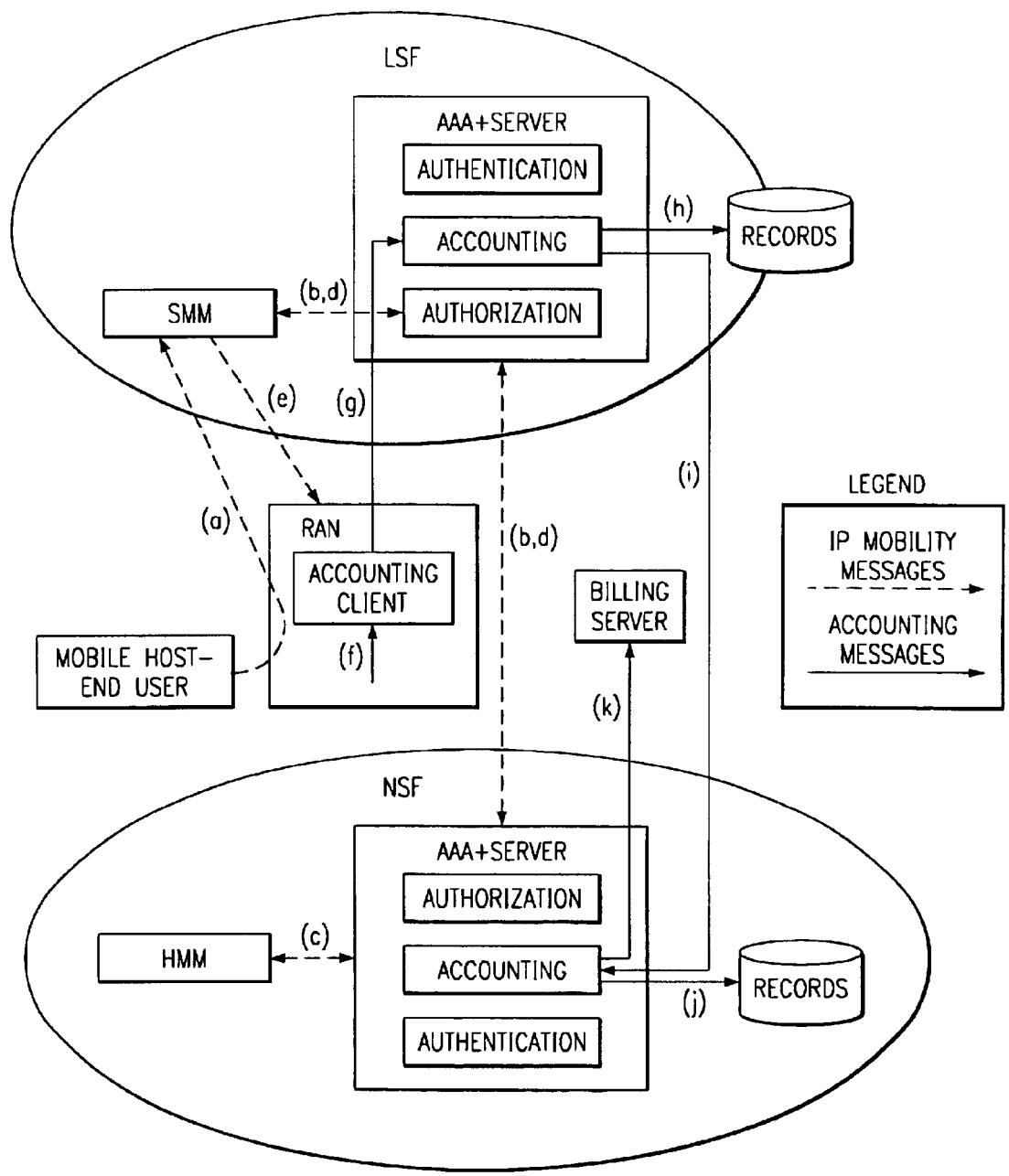
FIG. 8 illustrates an embodiment of an Access Session Accounting for Deregistration.

This scenario demonstrates the accounting activities on MH deregistration. The two main activities shown are the sending of the Stop_Record to the LSF Accounting Server and the transfer of the SDR from the LSF to the NSF Accounting Server indicating a completed session. The FIG. 8: Access Session Accounting for Deregistration describes each step that takes place during this process.

- a–e) The Deregistration procedure is performed during access session de-establishment
- f) The Deregistration Reply message received by the RAN in step (e) triggers various de-allocation activities including the "access session ended" event being sent by the RAN Connection Manager to the Accounting Client.
- g) The RAN Accounting Client creates the DIAMETER Accounting_Request message of type Stop_Record and sends it to the LSF Accounting Server. This message indicates the end of an access session. The Stop_Record contains all of the final usage data from the UAE representing this access session. The default UAE is then de-allocated.
- h) The SDR is updated and stored on local LSF disk.
- i) The SDR indicating a completed session is sent from the LSF Accounting Server to the home NSF Accounting Server.
- j) The home NSF Accounting Server stores the SDR on disk.
- k) The data will eventually be transferred to the Billing Server (as provisioned by the service provider)

Invocation of Service Session Through Allied Application Servers

Figure 9:
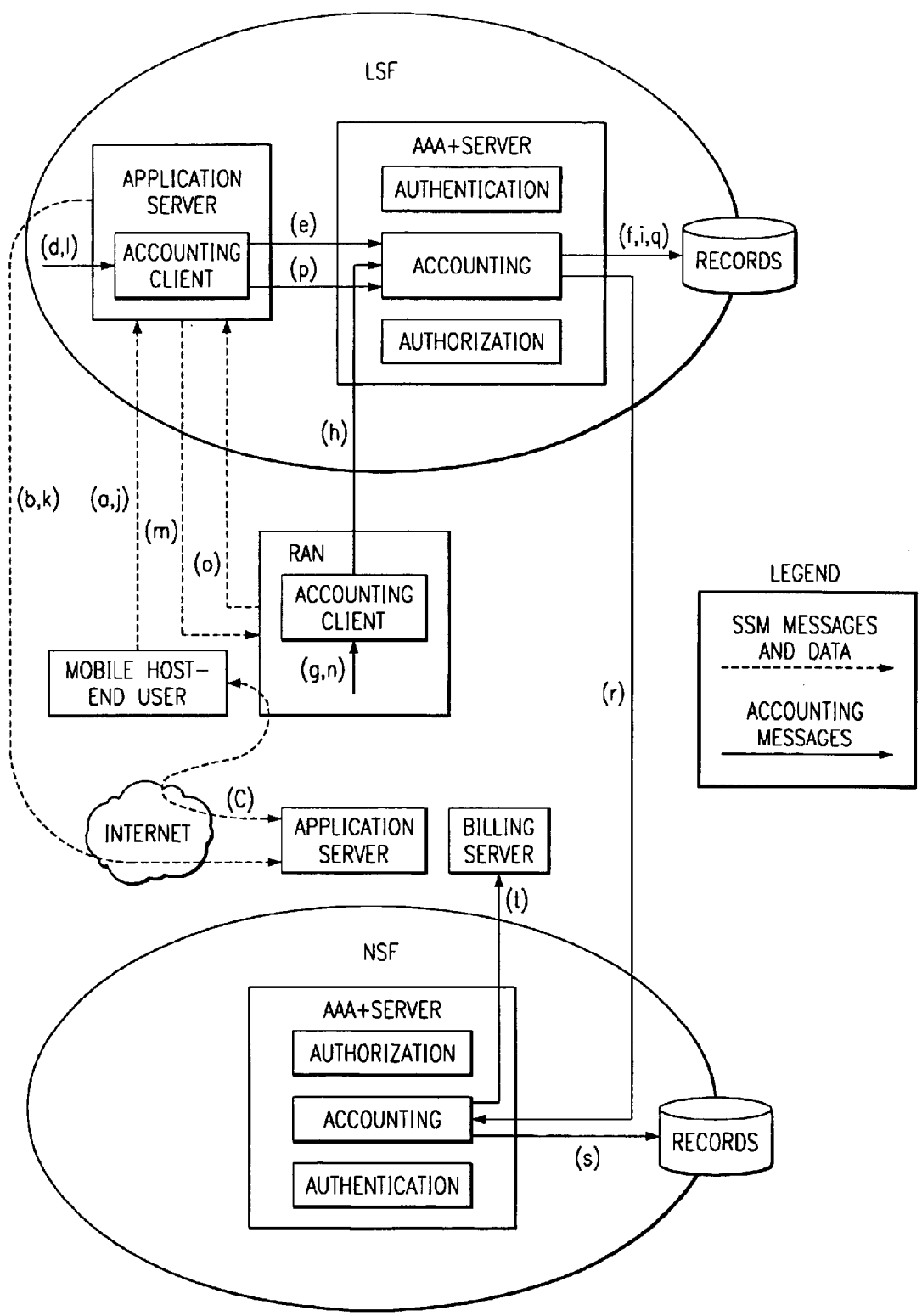
FIG. 9 illustrates an embodiment of Service Session Accounting.

This scenario demonstrates the accounting activities on a service session invocation where the service is provided at the core network allied application server. The service is assumed to be provided using the default bandwidth and QoS granted during registration. However, core network allied application server in association with the core network components can alter the default bandwidth and QoS. In this scenario, accounting must be made at both the access network (e.g. RAN) for usage data such as bytes transmitted and received and at the core network allied application server (for an example service invocation and duration). The FIG. 9: Service Session Accounting describes each step that takes place during this process.

- a) The service provided by the core network allied application server is invoked from the MH. At this point, the Accounting Model Indicator Establishment on Service Session Invocation (see FIG. 5: Accounting Model Indicator Establishment on Service Session Invocation) procedure occurs and is not repeated here for brevity. It is during this procedure that the service session UAE is instantiated at the RAN.
- b) Session control and setup messaging occurs from the originator (core network allied application server) to the terminating application server residing somewhere on the Internet or another LSF.
- c) The transport session bearer path is established between the MH and the terminating application server.
- d) The Accounting Client within the Core network allied application server detects the "service session invoked" event and creates the SAE.
- e) The Accounting Client within the Core network allied application server generates a DIAMETER Accounting_Request message of type Start_Record and sends it to the LSF Accounting Server to indicate start of service.
- f) The LSF Accounting Server creates the SDR and stores it on local disk.
- g) As data packets are transmitted and received over the bearer path, the "transport session packets sent/rcvd" event is detected within the RAN Accounting Client. The usage measurements for this session are captured in the RAN Accounting Client service session UAE.
- h) The usage measurements are packaged in a DIAMETER Accounting_Request message of type Interim_cord and sent to the Accounting Server in the LSF. The interim data records may be batched or sent in real-time depending on the collection method defined for this service session by the Accounting Model Indicator.
- i) The Interim_Record data is used to update the SDR on local LSF disk.
- j) The service session ends by the MH.
- k) Session control and de-allocation messaging occurs from the originator (Core network allied application server) to the terminating application server residing somewhere on the Internet or another LSF. The bearer path from c) is de-allocated.
- l) The Accounting Client within the core network allied application server detects the "service session ended" event.
- m) The application server (or another LSF session management component) sends a Resource De-allocation Request message to the Connection Manager in RAN.
- n) The Accounting Client within the RAN detects the "service session ended" event.
- o) The response to the Resource De-allocation Request message is sent from the RAN to the application server.

This response includes the final usage data from the service session UAE within the RAN. The service session UAE is de-allocated.

p) The Accounting Client within the Core network allied application server generates a DIAMETER Accounting_Request message of type Stop_Record (containing the final usage data from the service session UAE and the final data from the SAE) and sends it to the ISF Accounting Server to indicate end of service. The SAE is de-allocated.

q) The SDR is updated and stored on local LSF disk.

r) The SDR indicating a completed service session is sent from the ISF Accounting Server to the home NSF Accounting Server.

s) The home NSF Accounting Server stores the SDR on disk.

t) The data will eventually be transferred to the Billing Server (as provisioned by the service provider).

Invocation of Internet Service Session (Through Third Party Application Servers)

This scenario demonstrates the accounting activities on a service invocation where the service is provided on the Internet. The service is assumed to be provided using the default bandwidth and QoS granted during registration, thus the default UAE is used. The invocation and completion of the service is not reported to the LSF for accounting; only the RAN usage will be accounted.

a) The service provided by the Internet server is invoked from the MH. Bearer path is established and data is transmitted in both directions as requests and responses.

b) As data packets are transmitted and received, the "transport session packets sent/rcvd" event is detected within the RAN Accounting Client. The usage measurements of the session are captured in the RAN Accounting Client UAE.

c) The usage measurements are packaged in a DIAMETER Accounting_Request message of type Interim_Record and sent to the Accounting Server in the LSF. The interim data records may be batched or sent in real-time depending on the collection method defined for this service session by the Accounting Model Indicator designated for the access session.

d) The Interim_Record data is used to update the SDR (representing the access session) on local LSF disk.

Note: when the MH deregisters, the "Access Session Accounting for Deregistration" scenario takes place (as described previously—see FIG. 8). The final usage data is obtained from the RAN, the SDR is updated at the LSF Accounting Server, and the SDR is sent to the home NSF Accounting Server for eventual upload to the Billing Server.

Intra-LSF Handoff

Figure 10:
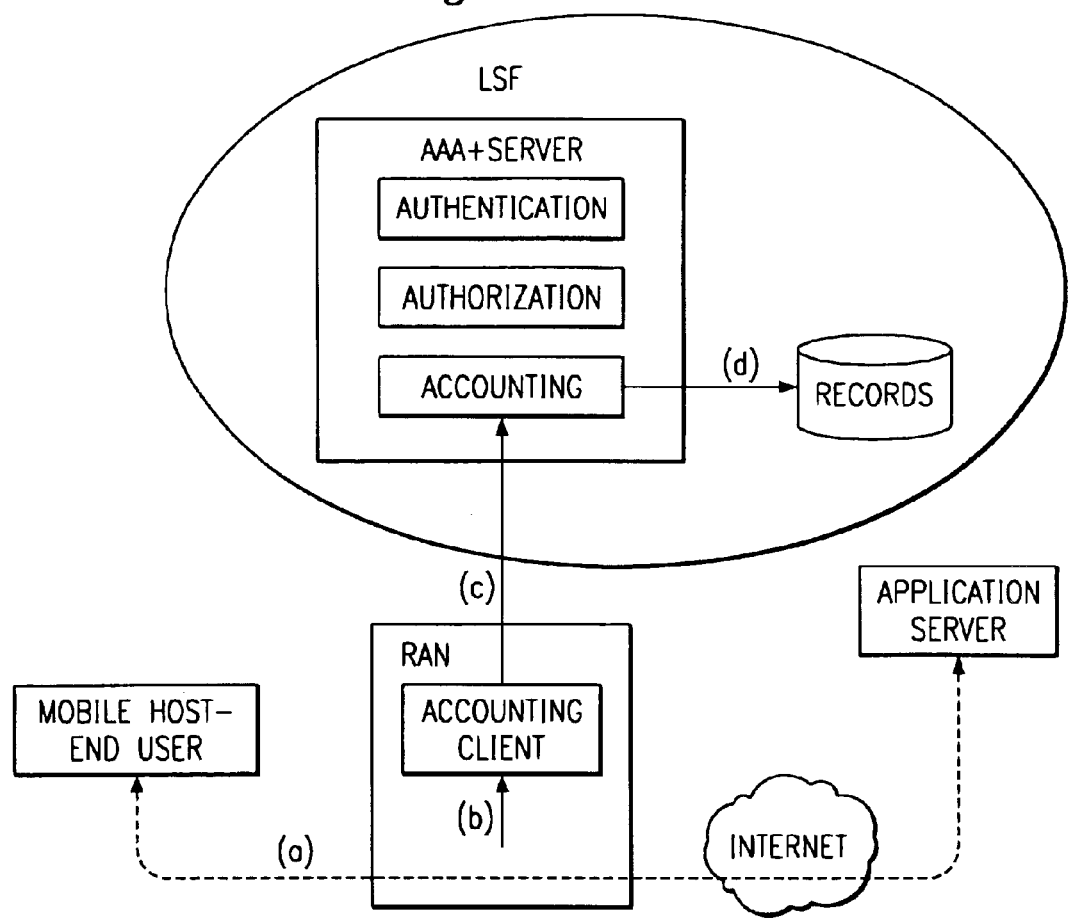
FIG. 10 illustrates an embodiment of Internet Service Accounting.

This scenario shown in FIG. 10: Intra-LSF Handoff; demonstrates the accounting activities when a handoff from one xAN to another xAN in the same LSF domain is required. In general, only updates to the SDR at the LSF Accounting Server are required since the handoff is within the same LSF.

Assumption: The SMM in the current LSF has received a registration message for system area change reason. Authentication, Address Update, Registration Reply, and Registration Cancellation procedures are invoked.

a) After the MD has initiated the handoff (not shown), the SMM informs the xAN-1 Connection Manager to start buffering datagrams destined to the user's MD. The Connection Manager updates the local router to start queuing datagrams destined to the MH.

b) The Connection Manager (xAN-1) sends the "handoff from xAN-1 to xAN-2" event to the xAN-1 Accounting Client.

c) The Accounting Client sends a DIAMETER Accounting-Request message to the LSF Accounting Server containing INTERIM_Records complete with last known usage data for all sessions active for the MD in xAN-1 followed by STOP_Records. The UAEs at xAN-1 for these sessions are deallocated.

d) The SDRs are updated and stored on local LSF disk.

e) The Connection Manager (xAN-1) issues an ACK command message back to the SMM. The Accounting Session ID parameter will be carried in the ACK message.

f) The SAM creates a Context Response message with MH's IP address and Accounting Session ID and sends it to the xAN-2 Connection Manager.

g) The Connection Manager in xAN-2 sends the "handoff from xAN-1 to xAN-2" event to the xAN-2 Accounting Client to establish a new accounting session for each of the MH's sessions. The Accounting Session ID received from xAN-1 will be used within the new UAEs. The xAN-1 Connection Manager updates the local router in xAN-1 to start forwarding datagrams destined to xAN-2 (not shown).

h–k) The SDRs are update with INTERIM_Records and STOP_Records (as described previously) and transferred to the home NSF Accounting Server to be made available to the Billing Server.

Inter-LSF Handoff

Figure 11:
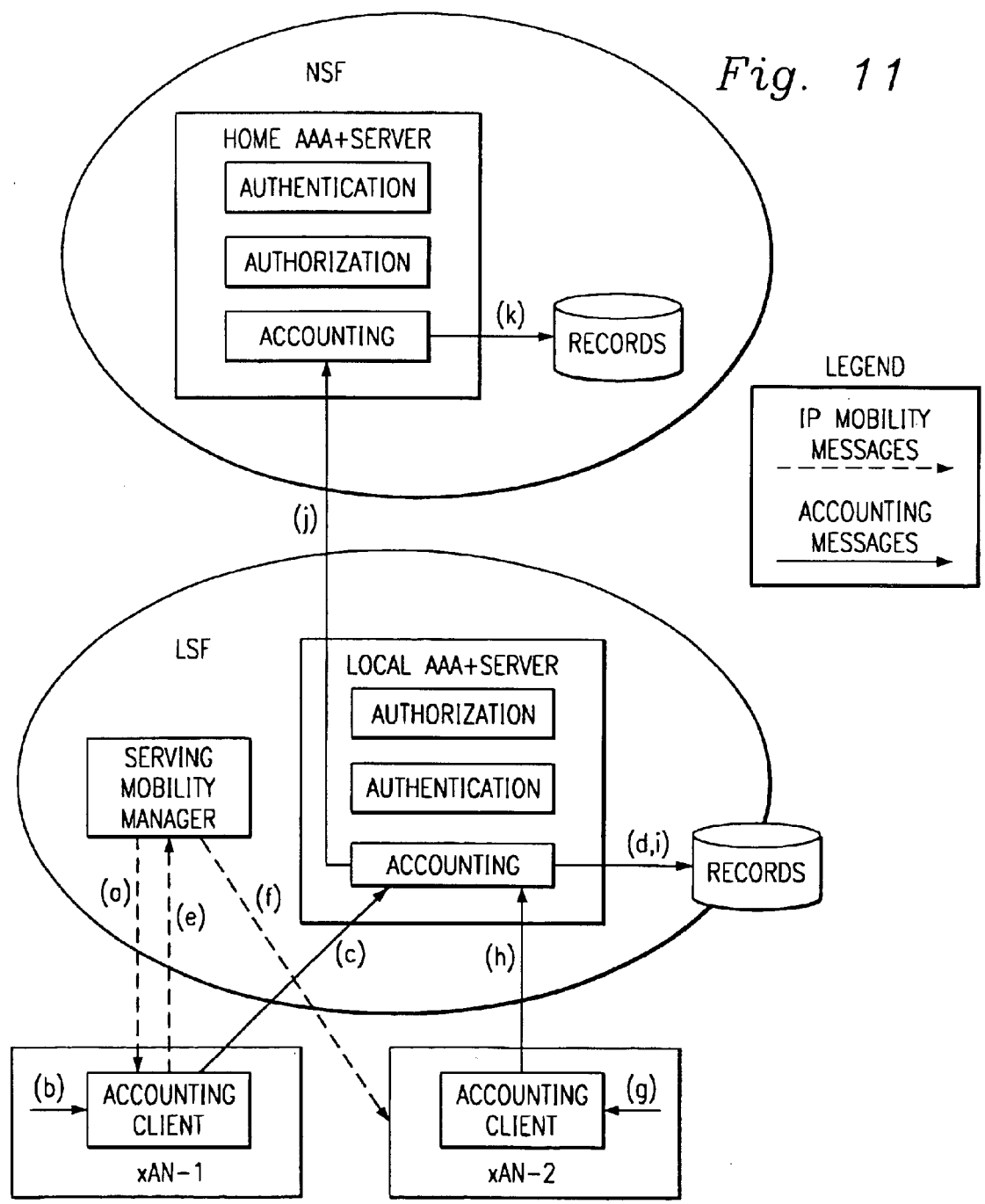
FIG. 11 illustrates an embodiment of Intra-LSF Handoff.
Figure 12:
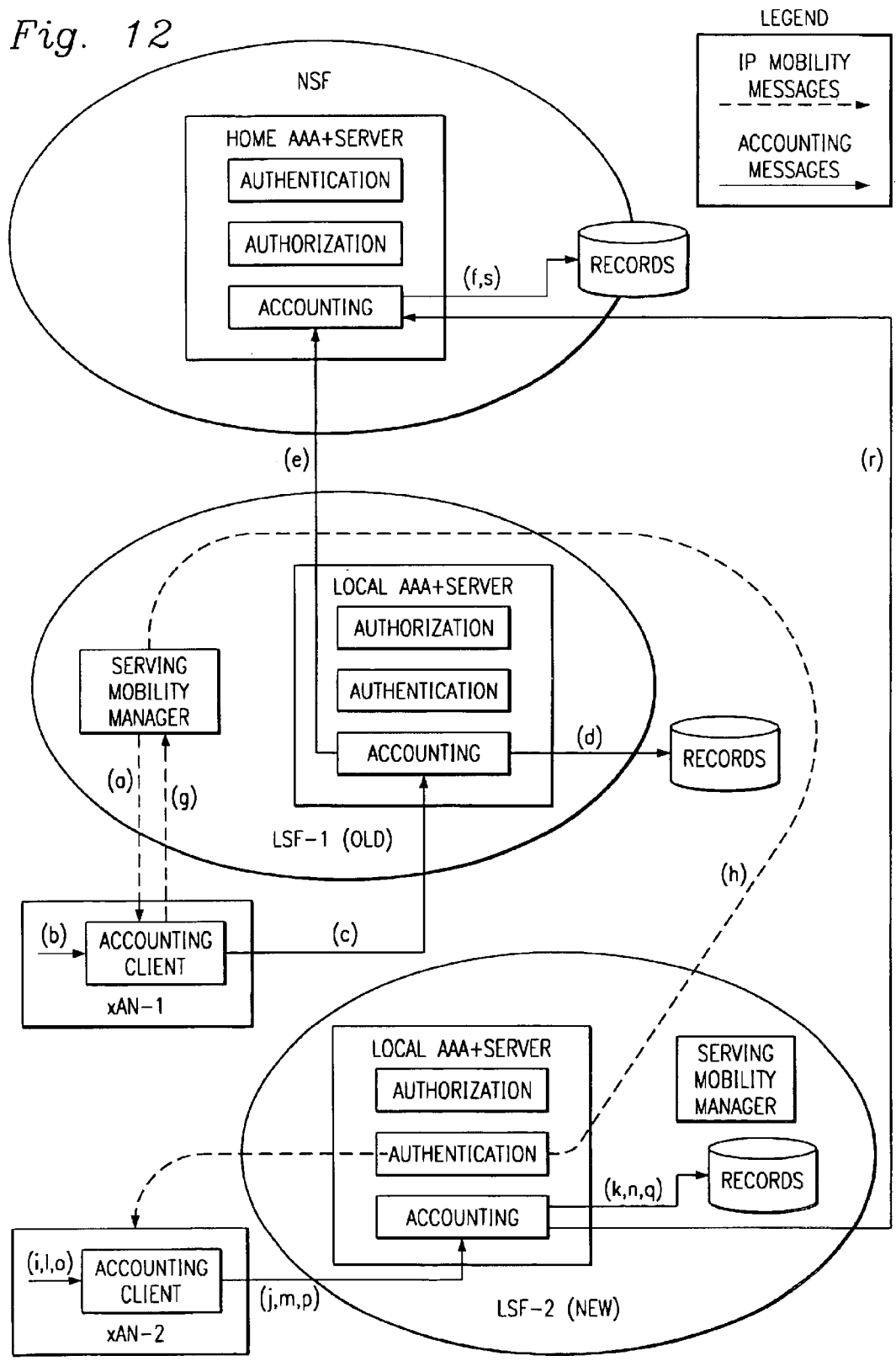
FIG. 12 illustrates an embodiment of Inter-LSF Handoff.

This scenario shown in FIG. 11: Inter-LSF Handoff; demonstrates the accounting activities when a handoff from one LSF to another LSF is required. As described previously, this is an event that requires the completion of the current session (within LSF-1) and the beginning of a new session (within LSF-2).

Assumption: The SM in the new LSF (LSF 2) has received a registration message for system area change reason. LSF-2 has requested context information from the old ISF: (LSF-1).

a) After the MH has initiated the handoff (not shown), the SMM informs the xAN-1 Connection Manager to start buffering datagrams destined to the user's MH. The Connection Manager updates the local router to start queuing datagrams destined to the MH.

b) The Connection Manager sends the "handoff from LSF-1 to LSF-2" event to the xAN-1 Accounting Client.

c) The Accounting Client sends a DIAMETER Accounting-Request message to the LSF-1 Accounting Server containing STOP_Records complete with final usage data for all sessions active for the MH. The UAEs for these sessions are de-allocated at xAN-1.

d) The SDRs are updated and stored on local LSF disk.

e) The SDR indicating a completed service session is sent from the LSF-1 Accounting Server to the home NSF Accounting Server.

f) The home NSF Accounting Server stores the SDR on disk. The data will eventually be transferred to the Billing Server (not shown).

g) The Connection Manager (xAN-1) issues an ACK command message back to the SMM. The Accounting Session ID parameter will be carried in the ACK message.

h) The SMM creates a Context Response message with MH's IP address and Accounting Session ID and sends it back to the LSF-2 SMM. During the registration that happens next (not shown here), the Accounting Session ID is passed to the xAN-2 Connection Manager.

i) The Connection Manager in xAN-2 sends the "handoff from LSF-1 to LSF-2" event to the xAN-2 Accounting Client to establish a new UAE for each of the MH's sessions. The Accounting Session ID received from LSF-1 will be used within the UAEs.

j) The Accounting Client sends a DIAMETER Accounting-Request message of type START_Record to the LSF-1 Accounting Server for each new UAE.

k) The SDRs are created and stored on local LSF disk.

l–s) The SDRs are updated with INTERIM_Records and STOP_Records (as described previously) and transferred to the home NSF Accounting Server to be made available to the Billing Server.

Although illustrative embodiments of the invention have been shown and described, a wide range of modification, change, and substitution is contemplated in the foregoing disclosure and in some instances, some features of the present invention may be employed without a corresponding use of the other features. Accordingly, it is appropriate that the appended claims be constructed broadly and in a manner consistent with the scope of the invention.

What is claimed is:

1. A method for a first user to communicate in an Internet Protocol (IP) centric distributed network with a plurality of service layers providing a plurality of functions associated with each of the service layers, the method comprising:

accessing the network to establish a point of presence at an access management layer and a core portion of the network and to designate a default amount of bandwidth and a plurality of default setup parameters;

invocating a service through an application server on the network to establish an amount of network resources requested by the first user;

establishing a transport session to create and manage a connection from the first user to a destination address; and accounting for a service session within the IP centric distributed network.

2. The method of claim 1 wherein the plurality of service layers includes a network service function layer.

3. The method of claim 1 wherein the plurality of service layers includes a local service function layer.

4. The method of claim 1 wherein the plurality of service layers includes an access service function layer.

5. The method of claim 3 further including distribution of client server functions within the local service layer.

6. The method of claim 1 further including distribution of client server functions within an access network.

7. The method of claim 1 further including distribution of client server functions within third party Internet application server.

8. The method of claim 1 wherein a visiting mobile host user establishes the accounting for a service session by going through a local service layer in the visiting network which establishes contact to a network service layer in a home network of the mobile host user.

9. The method of claim 1 wherein an authentication, authorization and accounting server in a network service layer is a server and wherein an authentication, authorization and accounting server in a local service layer is a client.

10. The method of claim 3 wherein the local service layer updates interim data and updates an authentication, authorization and accounting server in a network service layer.

11. The method of claim 4 wherein an usage accounting entry is created within the access network.

12. The method of claim 3 wherein an service accounting entry is created within the local service layer in an allied application server.

13. The method of claim 11 wherein the accounting actually accumulates on an usage accounting entry according than accounting model indicator.

14. The method of claim 12 wherein the accounting actually accumulates on an service accounting entry according to an accounting model indicator.

15. The method of claim 1 further including an usage accounting entry at the access layer which accumulates data regardless of contents of an accounting model indicator.

16. The method of claim 1 further including invoking a specific usage accounting entry at an access network and a specific service accounting entry at an allied server application for each service invoked.

17. The method of claim 16 further including an accounting model indicator which describes a collection method and policy rules, and wherein the accounting model indicator is transferred to the access network and an allied application server at a local service layer.

18. The method of claim 1 wherein a service accounting entry has a one to one relationship with a Session Detail Record (SDR).

19. The method of claim 1 wherein a service accounting entry can have a relationship with more than one usage accounting entry.

20. The method of claim 1 wherein a SDR can have a relationship with more than one usage accounting entry.

21. The method of claim 1 wherein a SDR can have a relationship with more than one service accounting entry.

22. The method of claim 1 wherein multiple services can be invoked in a single session.

23. The method of claim 1 wherein service is invoked through an allied application server at a local service layer, and wherein the allied application server seeks authorization from an authorization server based on an accounting policy within an accounting model indicator and wherein the authorization server sends details to the allied application server to create a service accounting entry.

24. The method of claim 1 further including creating an usage accounting entry at an access network wherein an allied application server sends instructions to the access network based on details within an accounting model indicator.

25. The method of claim 1 further including creating an service accounting entry at a local service layer wherein the local service layer sends instructions to the access network based on details within an accounting model indicator.

26. The method of claim 1 further including layer three messages communicate to an access network and communicates directly to the local service layer to establish an usage accounting entry.

27. The method of claim 1 wherein the accounting is duplicated at at least two of the following group: an access network, a local service layer, and a network service layer.

28. The method of claim 1 wherein the accounting includes collecting multiple SDRs according to an accounting session ID and sending the multiple SDRs to a billing server at a network service layer.

29. The method of claim 28 further including creating a bill combining all SDRs.

30. The method of claim 28 further including transferring the accounting session ID from a local service layer to another local service layer to facilitate combining of multiple SDRs.

31. The method of claim 28 further including transferring a context message with the accounting session ID and a profile that includes an accounting model indicator during a handoff from one local service layer to another.

32. A system for a first user to communicate in an Internet Protocol (IP) centric distributed network with a plurality of service layers providing a plurality of functions associated with each of the service layers, the system comprising:
- a means for accessing the network to establish a point of presence at an access management layer and a core portion of the network and to designate a default amount of bandwidth and a plurality of default setup parameters;
- an application server on the network that invocates a service to establish an amount of network resources requested by the first user;
- a means for establishing a transport session to create and manage a connection from the first user to a destination address; and
- a means for accounting for a service session within the IP centric distributed network.

33. The system of claim 32 wherein the plurality of service layers includes a network service function layer.

34. The system of claim 32 wherein the plurality of service layers includes a local service function layer.

35. The system of claim 32 wherein the plurality of service layers includes an access service function layer.

36. The system of claim 34 further including client server functions distributed within the local service layer.

37. The system of claim 32 further including client server functions distributed within an access network.

38. The system of claim 32 further including client server functions distributed within a third party Internet application server.

39. The system of claim 32 wherein a visiting mobile host user establishes the accounting for a service session by going through a local service layer in the visiting network which establishes contact to a network service layer in a home network of the mobile host user.

40. The system of claim 32 wherein an authentication, authorization and accounting server in a network service layer is a server and wherein an authentication, authorization and accounting server in a local service layer is a client.

41. The system of claim 34 wherein the local service layer updates interim data and updates an authentication, authorization and accounting server in a network service layer.

42. The system of claim 35 wherein an usage accounting entry is created within the access network.

43. The system of claim 34 wherein an service accounting entry is created within the local service layer in an allied application server.

44. The system of claim 41 wherein the accounting actually accumulates on an usage accounting entry according to an accounting model indicator.

45. The system of claim 41 wherein the accounting actually accumulates on an service accounting entry according to an accounting model indicator.

46. The system of claim 32 further including an usage accounting entry at the access layer which accumulates data regardless of contents of an accounting model indicator.

47. The system of claim 32 further including a specific usage accounting entry invoked at an access network and a specific service accounting entry invoked at an allied server application for each service invoked.

48. The system of claim 47 further including an accounting model indicator which describes a collection method and policy rules, and wherein the accounting model indicator is transferred to the access network and an allied application server at a local service layer.

49. The system of claim 32 wherein a service accounting entry has a one to one relationship with a SDR.

50. The system of claim 32 wherein a service accounting entry can have a relationship with more than one usage accounting entry.

51. The system of claim 32 wherein a Session Detail Record (SDR) can have a relationship with more than one usage accounting entry.

52. The system of claim 32 wherein a SDR can have a relationship with more than one service accounting entry.

53. The system of claim 32 wherein multiple services can be invoked in a single session.

54. The system of claim 32 wherein service is invoked through an allied application server at a local service layer, and wherein the allied application server seeks authorization from an authorization server based on an accounting policy within an accounting model indicator and wherein the authorization server sends details to the allied application server to create a service accounting entry.

55. The system of claim 32 further including an usage accounting entry that is created at an access network wherein an allied application server sends instructions to the access network based on details within an accounting model indicator.

56. The system of claim 32 further including an service accounting entry that is created at a local service layer wherein the local service layer sends instructions to the access network based on details within an accounting model indicator.

57. The system of claim 32 further including layer three messages communicate to an access network and communicates directly to the local service layer to establish an usage accounting entry.

58. The system of claim 32 wherein the accounting is duplicated at at least two of the following group: an access network, a local service layer, and a network service layer.

59. The system of claim 32 wherein the accounting includes collecting multiple SDRs according to an accounting session ID and sending the multiple SDRs to a billing server at a network service layer.

60. The system of claim 59 further including a bill that combines all SDRs.

61. The system of claim 59 wherein the accounting session ID is transferred from a local service layer to another local service layer to facilitate combining of multiple SDRs.

62. The system of claim 59 further including a context message that is transferred with the accounting session ID and a profile that includes an accounting model indicator during a handoff from one local service layer to another.

63. A method for a first user to communicate in an Internet Protocol (IP) centric distributed network with a plurality of service layers including a network service function layer, a local service function layer, and an access service function layer providing a plurality of functions associated with each of the service layers, the system comprising:
- accessing the network to establish a point of presence at an access management layer and a core portion of the network and to designate a default amount of bandwidth and a plurality of default setup parameters;
- invocating a service through an application server on the network to establish an amount of network resources requested by the first user;
- establishing a transport session to create and manage a connection from the first user to a destination address; and accounting for a service session within the IP centric distributed network.

64. The method of claim 63 further including distribution of client server functions within the local service layer.

65. The method of claim 63 further including distribution of client server functions within an access network.

66. The method of claim 63 further including distribution of client server functions within a third party Internet application server.

67. The method of claim 63 wherein a visiting mobile host user establishes the accounting for a service session by going through a local service layer in the visiting network which establishes contact to a network service layer in a home network of the mobile host user.

68. The method of claim 63 wherein an authentication, authorization and accounting server in a network service layer is a server and wherein an authentication, authorization and accounting server in a local service layer is a client.

69. The method of claim 63 wherein the local service layer updates interim data and updates an authentication, authorization and accounting server in a network service layer.

70. The method of claim 63 wherein an usage accounting entry is created within the access network.

71. The method of claim 63 wherein an service accounting entry is created within the local service layer in an allied application server.

72. The method of claim 71 wherein the accounting actually accumulates on an usage accounting entry according to an accounting model indicator.

73. The method of claim 71 wherein the accounting actually accumulates on an service accounting entry according to an accounting model indicator.

74. The method of claim 63 further including an usage accounting entry at the access layer which accumulates data regardless of contents of an accounting model indicator.

75. The method of claim 63 further including invoking a specific usage accounting entry at an access network and a specific service accounting entry at an allied server application for each service invoked.

76. The method of claim 75 further including an accounting model indicator which describes a collection method and policy rules, and wherein the accounting model indicator is transferred to the access network and an allied application server at a local service layer.

77. The method of claim 63 wherein a service accounting entry has a one to one relationship with a Session Detail Record (SDR).

78. The method of claim 63 wherein a service accounting entry can have a relationship with more than one usage accounting entry.

79. The method of claim 63 wherein a SDR can have a relationship with more than one usage accounting entry.

80. The method of claim 63 wherein a SDR can have a relationship with more than one service accounting entry.

81. The method of claim 63 wherein multiple services can be invoked in a single session.

82. The method of claim 63 wherein service is invoked through an allied application server at a local service layer, and wherein the allied application server seeks authorization from an authorization server based on an accounting policy within an accounting model indicator and wherein the authorization server sends details to the allied application server to create a service accounting entry.

83. The method of claim 63 further including creating an usage accounting entry at an access network wherein an allied application server sends instructions to the access network based on details within an accounting model indicator.

84. The method of claim 63 further including creating an service accounting entry at a local service layer wherein the local service layer sends instructions to the access network based on details within an accounting model indicator.

85. The method of claim 63 further including layer three messages communicate to an access network and communicates directly to the local service layer to establish an usage accounting entry.

86. The method of claim 63 wherein the accounting is duplicated at at least two of the following group: an access network, a local service layer, and a network service layer.

87. The method of claim 63 wherein the accounting includes collecting multiple SDRs according to an accounting session ID and sending the multiple SDRs to a billing server at a network service layer.

88. The method of claim 87 further including creating a bill combining all SDRs.

89. The method of claim 87 further including transferring the accounting session ID from a local service layer to another local service layer to facilitate combining of multiple SDRs.

90. The method of claim 87 further including transferring a context message with the accounting session ID and a profile that includes an accounting model indicator during a handoff from one local service layer to another.

* * * * *